United States Patent
McKeefery

(10) Patent No.: US 11,736,194 B1
(45) Date of Patent: Aug. 22, 2023

(54) SYSTEM AND METHOD FOR DETERMINING A DRIVER DEVICE FROM A PLURALITY OF NETWORK DEVICES

(71) Applicant: NoCell Technologies, LLC, Aliso Viejo, CA (US)

(72) Inventor: Donald McKeefery, Irvine, CA (US)

(73) Assignee: NoCell Technologies, LLC, Aliso Viejo, CA (US)

( * ) Notice: Subject to any disclaimer, the term of this patent is extended or adjusted under 35 U.S.C. 154(b) by 127 days.

(21) Appl. No.: 17/345,389

(22) Filed: Jun. 11, 2021

(51) Int. Cl.
- *H04B 10/40* (2013.01)
- *H04B 17/318* (2015.01)
- *H04M 1/72463* (2021.01)
- *H04B 10/077* (2013.01)

(52) U.S. Cl.
CPC ......... *H04B 10/40* (2013.01); *H04B 10/0773* (2013.01); *H04B 17/318* (2015.01); *H04M 1/72463* (2021.01)

(58) Field of Classification Search
CPC .. H04B 10/40; H04B 10/0773; H04B 17/318; H04M 1/72463
See application file for complete search history.

(56) References Cited

U.S. PATENT DOCUMENTS

| | | | |
|---|---|---|---|
| 6,714,894 B1 | 3/2004 | Tobey et al. | |
| 7,389,178 B2 | 6/2008 | Raz et al. | |
| 7,561,054 B2 | 7/2009 | Raz et al. | |
| 8,527,013 B2 | 9/2013 | Guba et al. | |
| 8,682,572 B2 | 3/2014 | Raz et al. | |
| 8,706,872 B2 | 4/2014 | Moussavian et al. | |
| 8,718,536 B2 | 5/2014 | Hannon | |
| 8,805,639 B1 | 8/2014 | Musicant et al. | |
| D712,928 S | 9/2014 | Brener et al. | |
| 8,896,465 B2 | 11/2014 | Raz et al. | |
| 8,966,064 B2 | 2/2015 | Moussavian et al. | |
| 8,983,710 B2 | 3/2015 | Raz et al. | |

(Continued)

OTHER PUBLICATIONS

PCT/US2022/033087 filed Jun. 10, 2022, International Search Report and Wirtten Opinion dated Sep. 2, 2022.

(Continued)

*Primary Examiner* — Farid Seyedvosoghi
(74) *Attorney, Agent, or Firm* — Rutan & Tucker, LLP; Kyle M. St. James

(57) ABSTRACT

A computerized method for determining whether a first network device located within a vehicle is a driver device or is within a driver envelope is disclosed. The computerized method includes operations of detecting (i) movement of the first network device at a speed above a predetermined threshold and (ii) presence of a transceiver, obtaining network device identifier—received signal strength indicator (RSSI) value pairing data from the transceiver, wherein the network device identifier—RSSI value pairing data, and when a RSSI value of the first network device is a greatest value included within the network device identifier—RSSI value pairing data, determining the first network device is the driver device and implementing a set of policies on the first network device, wherein implementation of the set of policies is configured to restrict functionality of the first network device according to a predefined list of functionalities.

20 Claims, 12 Drawing Sheets

(56) References Cited

U.S. PATENT DOCUMENTS

| | | |
|---|---|---|
| 8,994,492 B2 | 3/2015 | Farhan et al. |
| 9,043,462 B2 | 5/2015 | Badiee et al. |
| 9,079,494 B2 | 7/2015 | Skelton |
| 9,185,526 B2 | 11/2015 | Guba et al. |
| 9,283,931 B2 | 3/2016 | Skelton |
| 9,338,605 B2 | 5/2016 | Guba et al. |
| 9,342,983 B1 | 5/2016 | Brener et al. |
| 9,369,196 B2 | 6/2016 | Hannon |
| 9,379,805 B2 | 6/2016 | Hannon |
| 9,398,421 B2 | 7/2016 | Guba et al. |
| 9,660,923 B2 | 5/2017 | Badiee et al. |
| 9,692,880 B2 | 6/2017 | Hannon |
| 9,707,928 B2 | 7/2017 | Skelton |
| 9,847,948 B2 | 12/2017 | Badiee et al. |
| 9,854,393 B2 | 12/2017 | Moussavian et al. |
| 9,854,433 B2 | 12/2017 | Hannon |
| 9,872,225 B2 | 1/2018 | Guba et al. |
| 9,887,887 B2 | 2/2018 | Hunter et al. |
| 9,955,352 B2 | 4/2018 | Mahaffey et al. |
| 10,025,958 B1 | 7/2018 | Todasco |
| 10,075,764 B2 | 9/2018 | Moussavian et al. |
| 10,079,931 B2 | 9/2018 | Nicholls et al. |
| 10,084,603 B2 | 9/2018 | Rogers et al. |
| 10,104,063 B2 | 10/2018 | Hu et al. |
| 10,122,846 B2 | 11/2018 | Hannon |
| 10,194,017 B2 | 1/2019 | Skelton |
| 10,205,819 B2 | 2/2019 | Hannon et al. |
| 10,268,530 B2 | 4/2019 | Breaux et al. |
| 10,271,265 B2 | 4/2019 | Breaux, III et al. |
| 10,412,538 B2 | 9/2019 | Moussavian et al. |
| 10,440,063 B1 | 10/2019 | Nevick et al. |
| 10,477,454 B2 | 11/2019 | Breaux et al. |
| 10,547,736 B2 | 1/2020 | Hannon et al. |
| 10,649,825 B2 | 5/2020 | Breaux et al. |
| 10,805,861 B2 | 10/2020 | Breaux, III et al. |
| 10,834,249 B2 | 11/2020 | Nicholls et al. |
| 10,868,837 B2 | 12/2020 | Nevick et al. |
| 10,868,838 B2 | 12/2020 | Nevick et al. |
| 2011/0021234 A1 | 1/2011 | Tibbitts et al. |
| 2011/0195699 A1* | 8/2011 | Tadayon ............... H04W 48/02 455/418 |
| 2014/0113619 A1* | 4/2014 | Tibbitts ................ B60T 8/172 455/419 |
| 2014/0364153 A1 | 12/2014 | Ren |
| 2016/0036964 A1* | 2/2016 | Barfield, Jr. .......... H04W 4/029 455/418 |
| 2016/0134744 A1* | 5/2016 | de la Fuente Sanchez ................ H04W 4/02 455/418 |
| 2017/0041737 A1 | 2/2017 | Fischer |
| 2018/0352074 A1* | 12/2018 | Swartz ............. H04M 1/72463 |
| 2020/0025859 A1 | 1/2020 | Kassas et al. |
| 2020/0062217 A1* | 2/2020 | Ledvina ................ H04W 76/10 |

OTHER PUBLICATIONS

Motion Intelligence, "How Motion Intelligence's Solution Works" https://vimeo.com/448673163, last accessed Jan. 20, 2022.

Motion Intelligence, "Why Motion Intelligence" https://vimeo.com/448671482, last accessed Jan. 20, 2022.

* cited by examiner

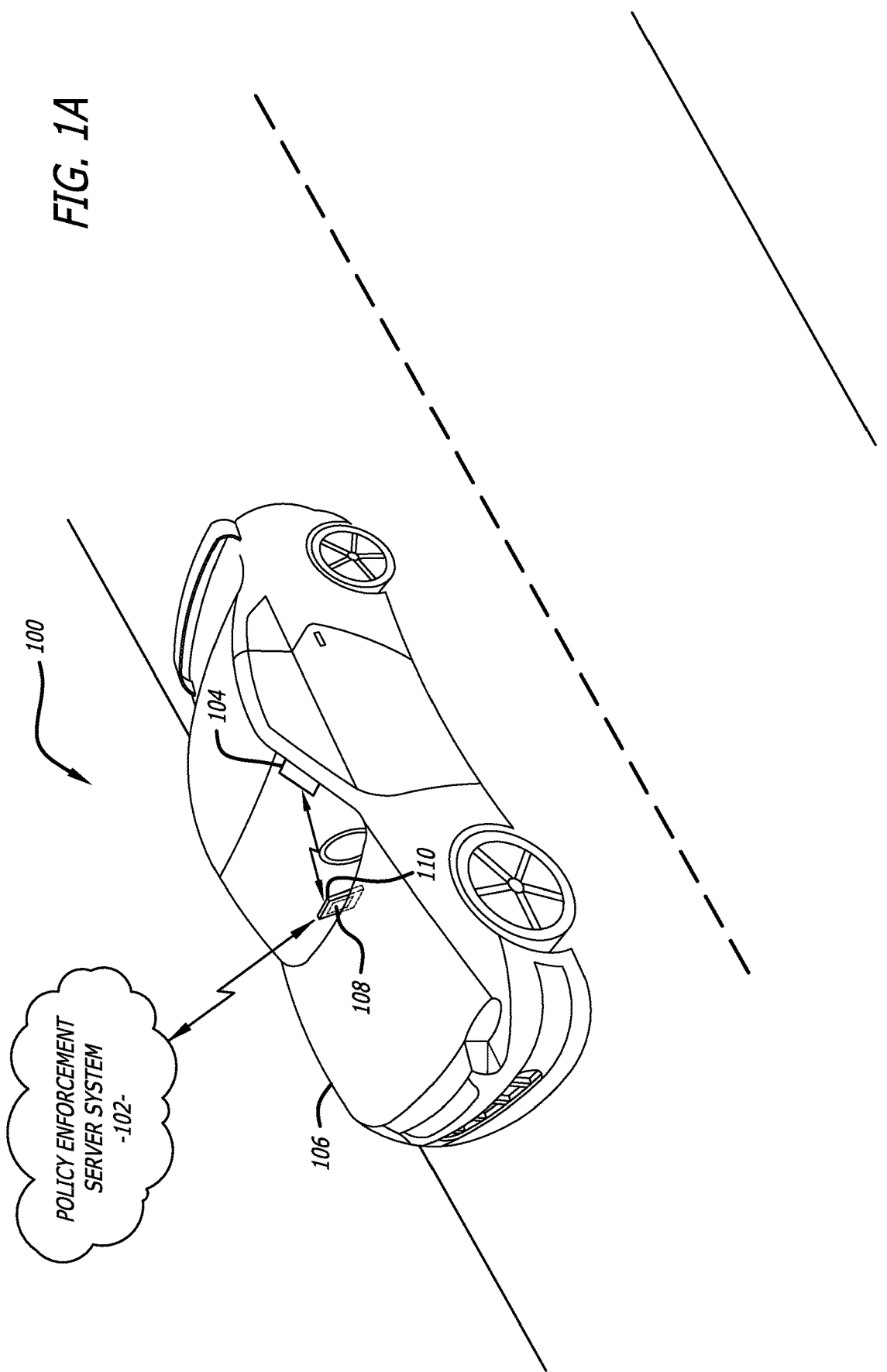

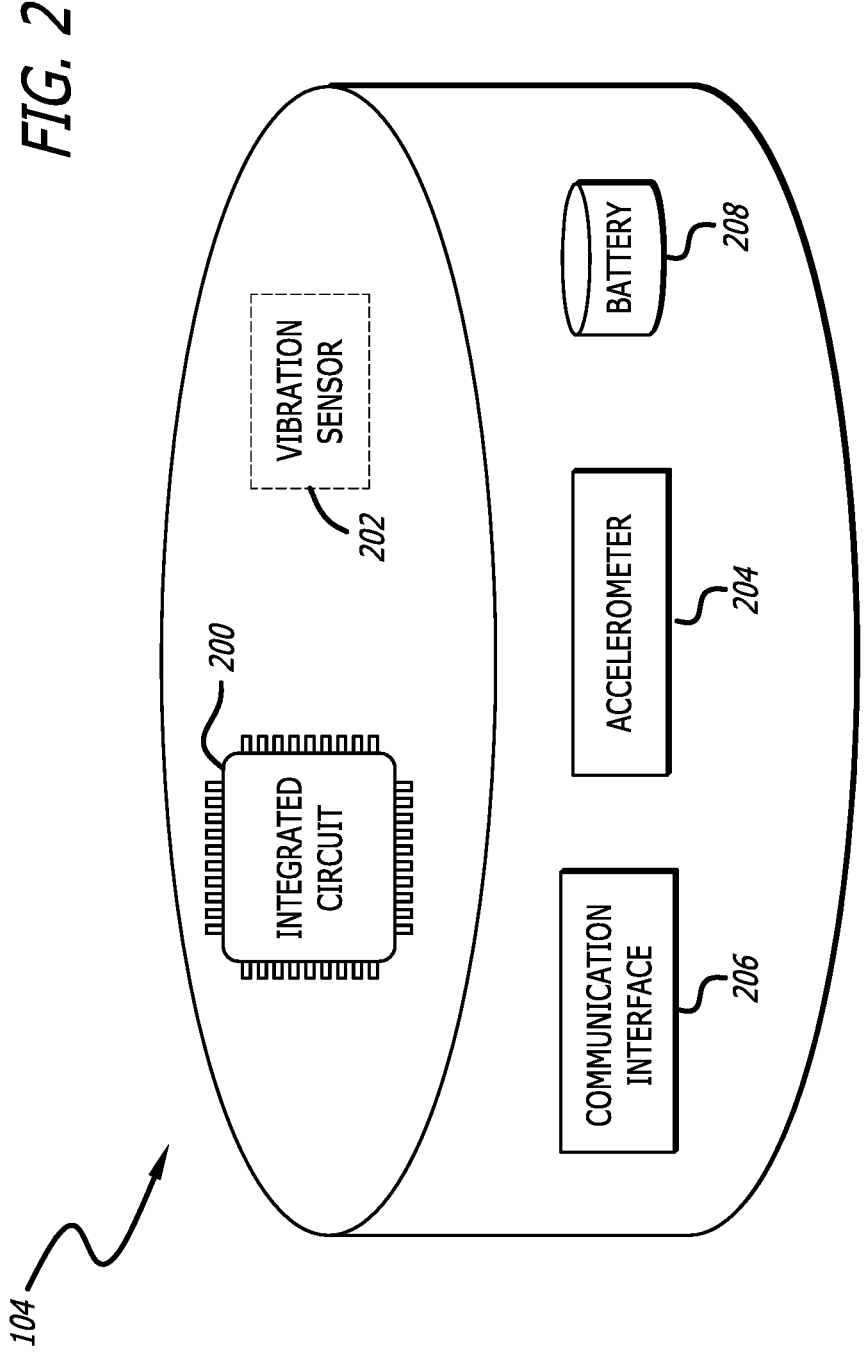

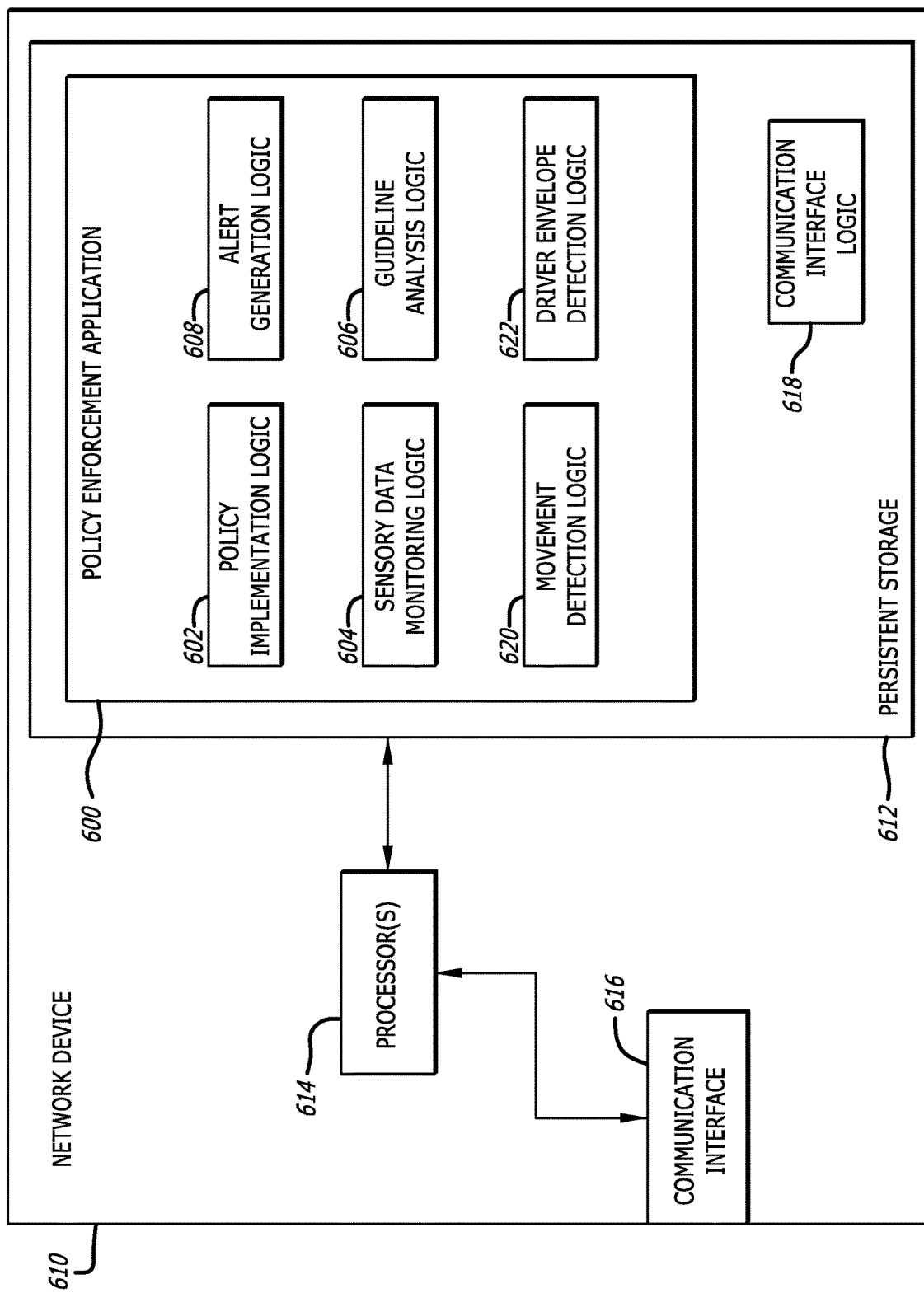

SYSTEM AND METHOD FOR DETERMINING A DRIVER DEVICE FROM A PLURALITY OF NETWORK DEVICES

FIELD

Embodiments of the disclosure relate to the field of restricting use of network devices. More specifically, one embodiment of the disclosure relates to a method of determining which network device of a plurality of network devices belongs to or otherwise is being utilized by a driver of a vehicle and implementing a set of policies that are configured to restrict or limit the use of the network device when operating in the vehicle.

GENERAL BACKGROUND

Distractions while driving, especially those from electronic devices, are at an all-time high. As mobile devices (e.g., cell phones) have become ubiquitous, it is commonplace for a driver to get into an automobile, start driving and become distracted with his/her cell phone. For instance, drivers often receive and respond to text messages or emails, browse the internet, or browse social media platforms while driving.

Driving while distracted as a result of the presence of electronic devices within reach is a dangerous, and at times, deadly, situation. Although some states have outlawed the act of using a cell phone while driving, not all drivers regularly adhere to these laws. Additionally, drivers may be distracted merely by notification alerts received by a cell phone. For example, a cell phone placed in a cup holder of the center console may alert the driver to a new text message or email via an audible and/or visual notification. The notification may cause the driver to take his/her eyes off of the road momentarily, which has the potential to result in an accident.

Many parents or employers wish to prevent their children/employees from being distracted by the child's or employee's cell phone while driving but also want their children or employees to have a cell phone in case of emergency. However, the use of some functionality of a cell phone may be warranted while driving. For example, a functionality of a cell phone that provides turn-by-turn directions may be used by some drivers and does not cause unnecessary distractions. Further, some drivers may be able to connect their cell phones to the automobile's audio system and play music while driving without causing unnecessary distractions. Additionally, once a child or employee completes his/her drive, there is no need to prevent the child or employee from using his/her cell phone.

Additionally, in many situations, there are multiple persons within a vehicle where each person possesses a network device (e.g., cell phone, tablet, etc.). Passengers (e.g., not the driver/operator of the vehicle) should often be permitted to utilize their own network device without restriction as such utilization should not result in distractions to the driver. Thus, prior to implementing a set of policies on a network, it may be advantageous to determine whether the network device belongs to or is otherwise being utilized by the driver.

BRIEF DESCRIPTION OF THE DRAWINGS

Embodiments of the invention are illustrated by way of example and not by way of limitation in the figures of the accompanying drawings, in which like references indicate similar elements and in which:

FIG. 1A is an exemplary illustration of a deployment of a policy enforcement system in connection with a first vehicle.

FIG. 2 is an exemplary block diagram of a wireless transceiver of the policy enforcement system of FIG. 1A.

FIG. 6 is an exemplary embodiment of a logical representation of the policy enforcement application of the policy enforcement system of FIG. 1A.

DETAILED DESCRIPTION

Figure 1B:
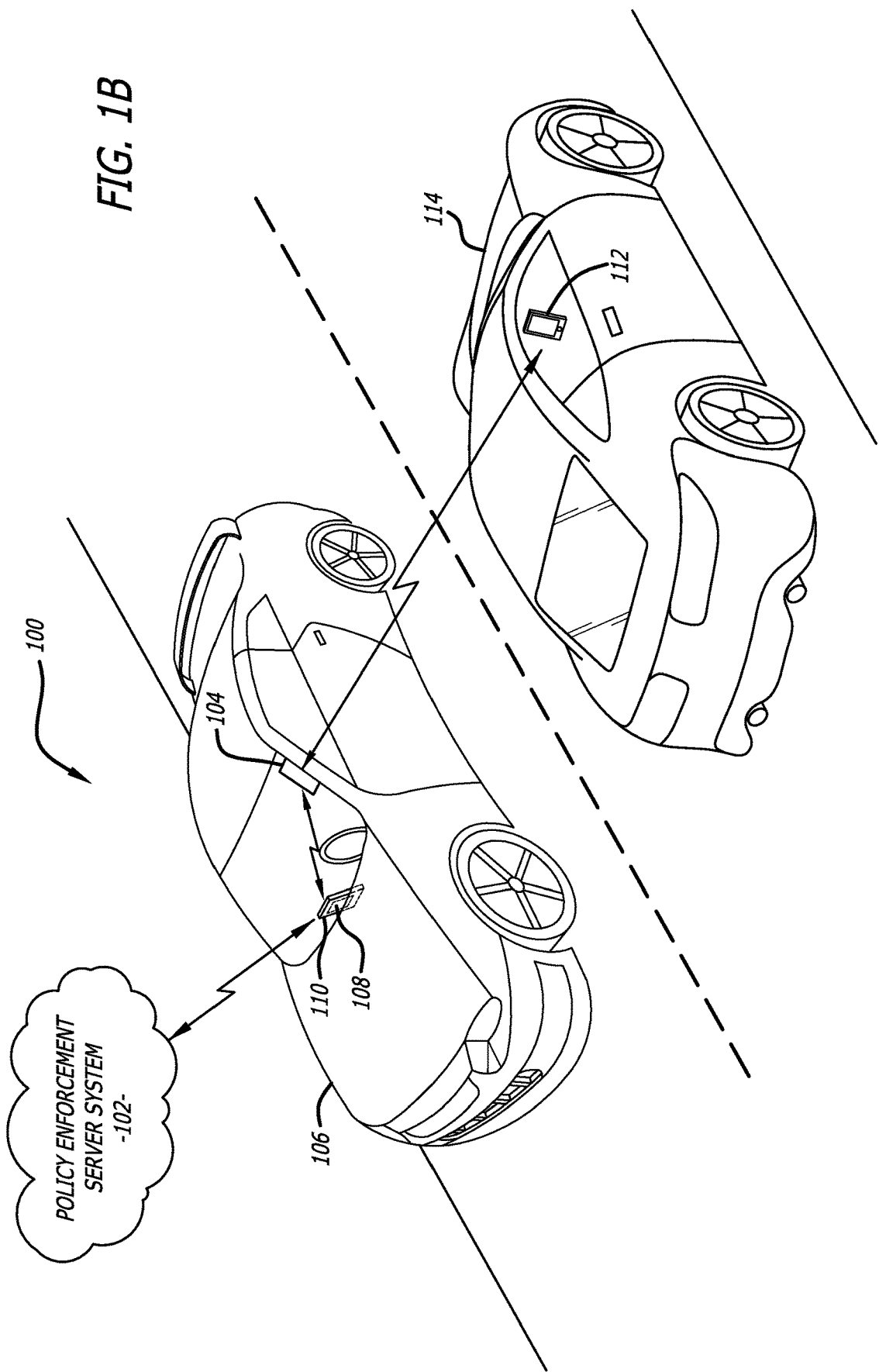
FIG. 1B is a second exemplary illustration of the policy enforcement system of FIG. 1A interacting with a network device of a second vehicle.

Embodiments of a system and methods are described for determining whether a network device is a driver device on which a set of policies are to be implemented to restrict or limit the use of the network device when operating in the vehicle. For purposes of clarity, a driver device may be considered as a network device on which a set of policies is to be implemented as compared to other network devices within the vehicle (or "passenger devices") on which a set of policies is not to be implemented. More particularly, a driver device may be assumed to be the network device that the driver of the vehicle will attempt to operate (e.g., the network device physically located closest to the driver).

Described herein is a policy enforcement system that includes a transceiver and a policy enforcement application operating on a network device. In some embodiments, the policy enforcement application may be downloaded on the network device. Generally, the policy enforcement system performs various methods to determine whether one or more network devices are located within an interior cabin space of a vehicle and whether the vehicle, along with each the network device, is moving at a speed above a predetermined threshold. When the policy enforcement system determines that the vehicle and a network device are traveling at a speed above the predetermined threshold, the policy enforcement application operating on the network device implements a set of policies that restrict or limit the use of the network device when operating in the vehicle. For example, the policy enforcement application may restrict or disable one or more predetermined functionalities of the network device.

For instance, the functionality to make phone calls or receive emails or other messages may be prevented while the set of policies are implemented. Additional examples of restricting functionality may include, but are not limited or restricted to, prevention of the use of social media applications, prevention of the use of a camera, preventing of the use of internet browser applications, etc.

The transceiver may be an electronic device capable of transmitting wireless signals, such as BLUETOOTH® beacons (e.g., BLUETOOTH® Low Energy (BLE)). Herein, the terms "transceiver" and "wireless transceiver" are used interchangeably, where wireless may refer to the transmission or receipt of data to or from a network device located within a proximity of the transceiver, where the proximity may include the interior cabin of the vehicle in which the transceiver is located as well as a surrounding area. For instance, the proximity of the transceiver may be an area defined by a radius of a circumference where the radius extends from the transceiver. As described below, the transceiver and a network device within proximity to the transceiver may communicate via an exchange of data, such as in the form of a wireless message. Based on the exchanged data, the policy enforcement application operating on the network device may implement a set of policies to restrict or limit the use of the network device when operating in the vehicle. In some embodiments, the transceiver may be located at a position within an interior cabin of a vehicle that is in close proximity to a driver's seat or to the steering wheel relative to other seats within the vehicle. For example, the transceiver may be affixed to the dashboard behind the steering wheel or in line with a driver's seat. In other examples, the transceiver may be affixed to the ceiling of the vehicle above the steering wheel or the driver's seat. In yet other embodiments the transceiver may be affixed to an upper left corner, a lower left corner or generally the left side of the vehicle's windshield relative to the driver's perspective.

The policy enforcement system may also monitor use, or attempted use, of a network device. For example, the policy enforcement application may monitor motion of the network device and determine whether such motion corresponds to a phone handling event, i.e., where the network device is being handled by a person. The policy enforcement application may also monitor the speed at which the network device is traveling to determine whether the set of policies should remain implemented or be released (e.g., no longer implemented). In some embodiments, the policy enforcement application may obtain data from the transceiver, where such data may be utilized by the policy enforcement application, in addition to the speed at which the network device is traveling, to determine whether the set of policies should remain implemented or be released.

Additionally, as will be discussed in further detail below, the policy enforcement system may perform operations that determine which network device of a plurality of network devices is a driver device on which a set of policies is to be implemented when the vehicle is in operation.

The policy enforcement system may perform additional operations and/or functionalities not explicitly described above that will become apparent throughout the description below and in view of the corresponding figures.

I. Terminology

In the following description, certain terminology is used to describe features of the invention. In certain situations, the term "logic" is representative of hardware, firmware, and/or software that is configured to perform one or more functions. As hardware, the logic may include circuitry having data processing or storage functionality. Examples of such circuitry may include, but are not limited or restricted to a microprocessor, one or more processor cores, a programmable gate array, a microcontroller, an application specific integrated circuit, wireless receiver, transmitter and/or transceiver circuitry, semiconductor memory, or combinatorial logic.

Alternatively, or in combination with the hardware circuitry described above, the logic may be software in the form of one or more software modules. The software module(s) may include an executable application, an application programming interface (API), a subroutine, a function, a procedure, an applet, a servlet, a routine, source code, a shared library/dynamic load library, or one or more instructions. The software module(s) may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code may be stored in persistent storage.

As mentioned above, the terms "transceiver" and "wireless transceiver" may be used interchangeably. Additionally, the term wireless transceiver refers to an electronic device configured to transmit and/or receive a wireless signal. The wireless transceiver may transmit data using any wireless technology, examples of which may include, but are not limited or restricted to, Wi-Fi, BLUETOOTH®, BLUETOOTH® Low Energy (BLE), radio waves (e.g., radio-frequency identification), one or more beacons, etc. In one embodiment, a wireless transceiver may refer to a communication interface of the center console of an automobile. In a second embodiment, a wireless transceiver may refer to a standalone electronic device that provides a wireless communication interface.

The term "computerized" generally represents that any corresponding operations are conducted by hardware in combination with software and/or firmware.

The term "network device" may be construed as a physical, electronic device or a virtual electronic device that is based on the execution of one or more software modules. The network device may be communicatively coupled to a public network such as the Internet or a private network such as a wireless data telecommunication network, wide area network, a type of local area network (LAN), or a combination of networks. Examples of the network device may include, but are not limited or restricted to, a physical electronic device (e.g., a personal computer such as a desktop, laptop, tablet or netbook; a mobile phone; a standalone appliance; a sensor; etc.). A network device may feature a plurality of electronic components, including one or more hardware processors (generally referred to as "processor"), at least one non-transitory storage medium, and an (network and/or I/O) interface. These components may be encased in a housing, which may be made entirely or partially of a rigid material (e.g., hard plastic, metal, glass, composites, or any combination thereof) that protects these components from certain environmental conditions.

The term "message" generally refers to any type of signaling such as wireless signaling including a beacon signal. Alternatively, the message may be information in a prescribed format and transmitted in accordance with a suitable delivery protocol. Hence, each message may be in the form of one or more packets, frames, or any other wireless signaling having the prescribed format.

The term "transmission medium" may be construed as a physical or logical communication path between two or more electronic devices. For instance, as a physical communication path, wired and/or wireless interconnects in the form of electrical wiring, optical fiber, cable, bus trace, or a wireless channel using infrared, radio frequency (RF), may be used.

Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. General Architecture—Policy Enforcement System

Referring to FIG. 1A, an exemplary illustration of a deployment of a policy enforcement system in connection with a first vehicle is shown. The policy enforcement system 100 includes a policy enforcement server system 102, a network device sensor 104 (also referred to herein as a "wireless transceiver") and an application 108. As illustrated, the policy enforcement system 100 is deployed in connection with the vehicle 106 wherein the wireless transceiver 104 and a network device 110 having the application 108 installed thereon are located within the vehicle 106. In one embodiment as illustrated, the policy enforcement server system 102 is in communication with the application 108 through the network device 110. However, in other embodiments, each of the components of the policy enforcement system 100 are in communication and operate collectively to enforce one or more sets of policies.

In particular, at a high-level, the wireless transceiver 104, the application 108 and the network device 110 perform operations to determine whether the vehicle 106 is moving and whether a set of policies is to be implemented with respect to the network device 110 based on any detected movement of the vehicle 106. In various embodiments, the application 108 may obtain sensory data from components of the network device 110 in order to determine movement (e.g., from an accelerometer and/or from a GPS unit). Alternatively, or in addition to, the wireless transceiver 104 may capture movement data via an accelerometer and/or vibration data via a vibration sensor. As will be discussed below, the movement/vibration data may be provided to the application 108 and be utilized by the application 108 in determining whether implementation of the set of policies is to be continued. As used herein, sensory data refers to any data associated with data obtained through one or more sensors (e.g., accelerometer, GPS unit, gyroscope, vibration sensor, etc.).

Referring now to FIG. 1B, a second exemplary illustration of the policy enforcement system of FIG. 1A interacting with a network device of a second vehicle is shown. FIG. 1B provides a similar illustration as FIG. 1A in which the policy enforcement system 100 is deployed in connection with the vehicle 106. However, FIG. 1B further illustrates that the policy enforcement system 100 may interact with network devices located in other vehicles (e.g., the network device 112 located within the vehicle 114). As discussed above, each network device may transmit a signal at regular time intervals including certain information, such as a Universally Unique Identifier (UUID), that enables logic included within the wireless transceiver ("wireless transceiver logic") to identify each network device. In some embodiments, the wireless transceiver logic may be programmed into an integrated circuit, as seen in FIG. 2. As will be discussed below with respect to FIGS. 4-5B, the wireless transceiver may form one or more lists identifying detected network devices in order to assess the content of the list(s) against a set of policies and/or driver/vehicle guidelines (discussed below), and, when applicable, transmit an alert to an administrator. Although not illustrated, an instance of the application 108 may be installed on the network device 112.

Figure 1C:
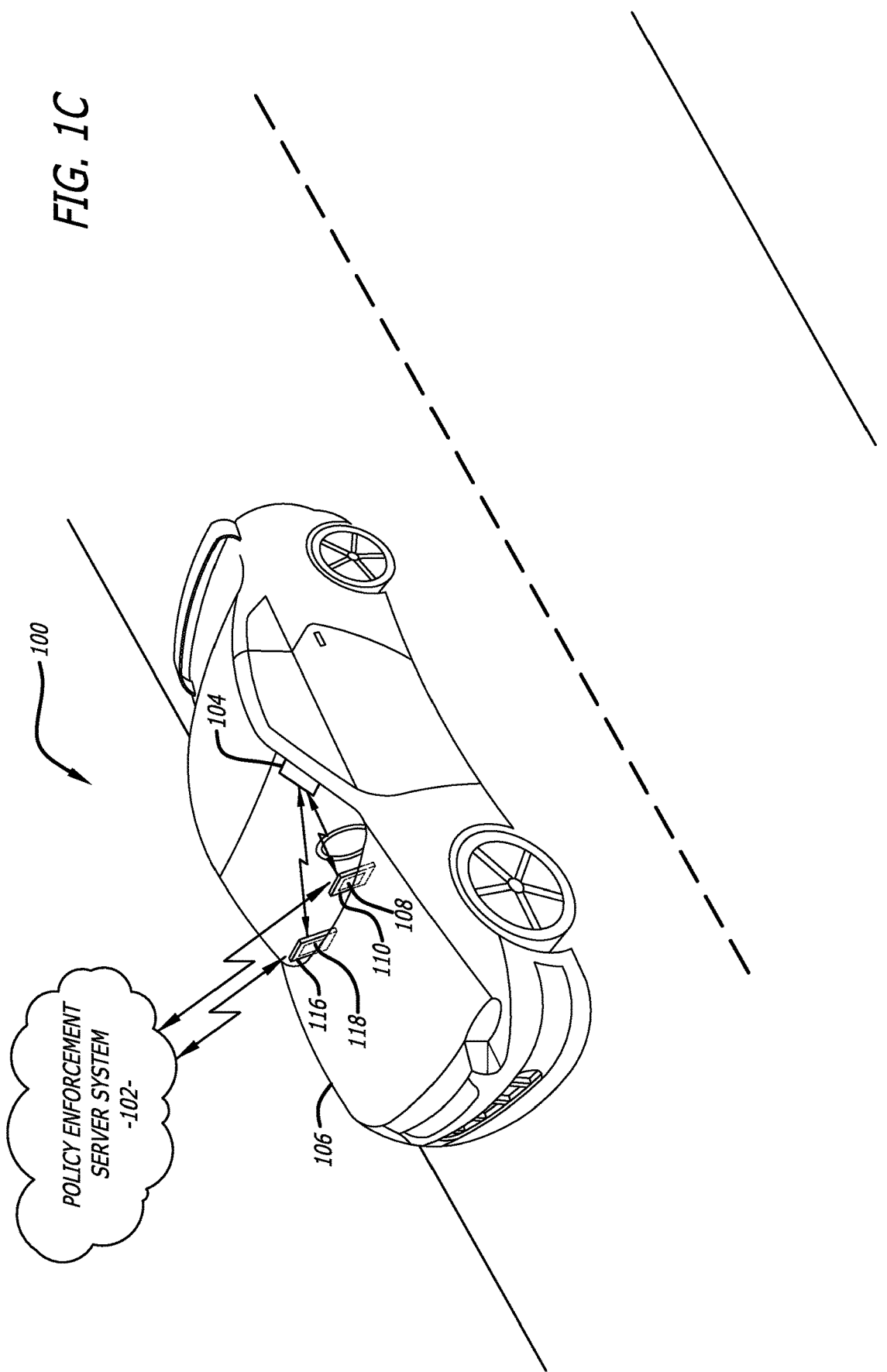
FIG. 1C is a third exemplary illustration of the policy enforcement system of FIG. 1A wherein two network devices are located within the first vehicle.

Referring to FIG. 1C, a third exemplary illustration of the policy enforcement system of FIG. 1A wherein two network devices are located within the first vehicle is shown. FIG. 1C provides a similar illustration as FIG. 1A in which the policy enforcement system 100 is deployed in connection with the vehicle 106. However, FIG. 1C further illustrates that the policy enforcement system 100 may interact with multiple network devices located in a single vehicle (e.g., the network devices 110, 118 located within the vehicle 106). In various embodiments, a first set of policies may be applied by each application to their corresponding network devices, different sets of policies may be applied to each network device, or a first set of policies may be applied to only one of the multiple devices. As will be discussed in detail below, each instance of the policy enforcement application (e.g., application 108 and 116) will attempt to connect to and communicate with wireless transceiver 104. Based on information received from the wireless transceiver 104, each instance of the policy enforcement application will determine whether its corresponding network device is closest to the wireless transceiver 104, and when its corresponding network device is closest to the wireless transceiver 104, the application will apply a set of policies to restrict and/or limit the functionality of its network device. In other embodiments, each instance of the policy enforcement application will determine whether its corresponding network device is within a predetermined distance to the wireless transceiver 104 (e.g., based on the corresponding RSSI value), and when its corresponding network device is within the predetermined distance to the wireless transceiver 104, the application will apply a set of policies to restrict and/or limit the functionality of its network device.

In some embodiments, a set of policies may only be applied to the network device determined to be closest in proximity to the wireless transceiver 104, i.e., with the expectation that such network device is being handled by the driver (i.e., as is seen in FIGS. 1A-1C, the wireless transceiver 104 is coupled to the interior of the vehicle on the side of the windshield opposite a front passenger seat). In alternative embodiments, a first set of policies may be applied to all network devices determined with be located within the vehicle 106 in order to remove all distractions. Predetermined rules or configuration settings may be used to determine which of the above applies. For example, a first rule set (e.g., driver/vehicle guidelines) may be used by the policy enforcement system 100 when deployed in connection with a truck or van within a commercial fleet (e.g., apply a set of policies to all network devices having an instance of policy enforcement application installed thereon). As an additional example, a second rule set may be used by the policy enforcement system 100 when deployed in connection with an individual's personal vehicle (e.g., apply a set of policies only to the network device determined to be located closest to the wireless transceiver, i.e., the network device of the driver).

Referring to FIG. 2, an exemplary block diagram of a wireless transceiver of the policy enforcement system of FIG. 1A is shown. The wireless transceiver 104 (as referenced above, also referred to as a "network device sensor") is shown as having the shape of an ellipse. The wireless transceiver 104 may have a height (e.g., constant in some embodiments but may vary in others) in order to accommodate components housed within. It should be understood that the wireless transceiver 104 may take many different shapes and the disclosure is not intended to be limited to the wireless transceiver 104 having the shape of an ellipse. Examples of other shapes include, but are not limited or restricted to, a triangle, a rectangle, a rhombus or a trapezoid. Further, the wireless transceiver 104 may be, for example, predominantly spherical and include a flat edge configured for attachment to a surface, such as an interior panel of a vehicle. In some embodiments, the wireless transceiver 104 may include a housing, which is made entirely or partially of a hardened material (e.g., hardened plastic, metal, glass, composite or any combination thereof) that protects circuitry and other components within the housing, namely an integrated circuit 200, an optional vibration sensor 202, an accelerometer 204, a communications interface 206 and a battery 208. The communication interface 206, under control by a communication interface logic (not shown), enables communications with external network devices, such as network devices and/or a cloud server.

According to one embodiment of the disclosure, the communication interface 206 may be implemented with one or more radio units for supporting wireless communications with other electronic devices. Additionally, or in the alternative, the communication interface 206 may be implemented as a physical interface including one or more ports for wired connectors. The communication interface logic may perform operations to cause the receipt and transmission of electronic data via the communication interface 206.

The integrated circuit 200 may be configured to perform operations including receiving and parsing signals from network devices (e.g., to identify each network device and determine the RSSI of each signal) and performing scans for network devices to determine network devices detected during multiple scans. In one embodiment, a scan may refer to the transceiver 104 initiating a time period ("scan time period") during which it receives and records transmissions from network devices for further analysis, where a transmission may be referred to as a beacon that is automatically transmitted by a network device at regular intervals. A transmission may include certain information such as a device address (such as a UUID or other identifier), an RSSI value, and data (which, in some embodiments, may be an advertisement packet). The scan may conclude when the transceiver 104 no longer records transmissions that were received (or otherwise detected) for the further analysis.

In one embodiment, the further analysis may include "detecting" network devices that are within a predetermined proximity to the transceiver 104 based on the RSSI value of the received and recorded transmission during the scan. For example, the integrated circuit 200 of the transceiver 104 may perform operations including comparing the RSSI of a transmission from each network device against a guideline threshold (where satisfying the comparison indicates detection of a network device within the predetermined proximity) and transmitting an alert to the policy enforcement server system 102 of FIGS. 1A-1C when a plurality of network devices are detected (or when the number of network devices is above a threshold number, which may be based on the number of network devices expected in the vehicle at a given time based on known expected routes, expected drivers and expected passengers). The integrated circuit may also perform operations that cause the communication interface 206 to transmit sensory data to the application 108 and/or the policy enforcement server system 102 (in embodiments in which the policy enforcement server system 102 is in communication with wireless transceiver 104). Additional operations performed by the integrated circuit 200 included in the further analysis are discussed throughout, wherein the integrated circuit 200 may be referred to as "wireless transceiver logic" in some embodiments.

In embodiments in which the wireless transceiver 104 includes the vibration sensor 202, the vibration sensor 202 is configured to perform operations including detecting and recording vibration. As will be discussed below, the vibration sensor 202 may detect vibration of a vehicle and the wireless transceiver 104 may transmit a signal to a network device (e.g., the network device 110) to be parsed and analyzed by the application 108. The application 108 may then utilize the vibration data in determining whether to implement, or withdraw implementation of, a set of policies with respect to the network device. The accelerometer 204 performs operations including detecting and recording acceleration (e.g., movement). As will be discussed below, the accelerometer 204 may detect acceleration of a vehicle and the wireless transceiver 104 may transmit a signal to a network device (e.g., the network device 110) to be parsed and analyzed by the application 108. The application 108 may then utilize the acceleration data ("movement data") in determining whether to implement, or withdraw implementation of, a set of policies with respect to the network device.

In embodiments in which the vibration sensor 202 is not included in the wireless transceiver 104, the wireless transceiver 104 may obtain sensory data from the accelerometer 204 and perform operations, via logic, that simulate the functionality of a vibration sensor. This functionality is simulated via one of several available operating modes of the accelerometer 204 by utilizing a method that recognizes both positive and negative acceleration, and generates an interrupt when the value is greater than a predetermined threshold. The value of acceleration represents movement in any of the X, Y, or Z directions, and/or any combination thereof. Each interrupt lasts for a calculated length of time using the formula: 1/ODR, with Output Data Rate (ODR) representing a predetermined frequency, the value of which is configured and stored in control registers.

In some embodiments, the movement/vibration data may be a byte within a signal transmitted from the wireless transceiver to the network device at specified time intervals (e.g., every 10, 15 or 30 seconds). In some embodiments, the byte comprises a series of bits, with each bit indicating a movement/vibration status for each time interval. As one illustrative example, the signal may include the following series of bits as shown and described in the following Table 1.

TABLE 1

| Interval | Bit series | Status of last interval |
| --- | --- | --- |
| $time_0$ | 0000 0001 | movement/vibration detected |
| $time_1$ | 0000 0011 | movement/vibration detected |
| $time_2$ | 0000 0111 | movement/vibration detected |
| $time_3$ | 0000 1110 | no detection |
| $time_4$ | 0001 1101 | movement/vibration detected |
| $time_5$ | 0011 1011 | movement/vibration detected |
| $time_6$ | 0111 0111 | movement/vibration detected |
| $time_7$ | 1110 1111 | movement/vibration detected |

Each interval may comprise 10 seconds and the delay time for withdrawing implementation of the set of policies may be 80 seconds. Therefore, once the application detects movement and implements the set of policies, the application will monitor the bit series received in the signal from the wireless transceiver and continue implementation of the policy until either (1) the bit series reads "0000 0000" (i.e., no movement for 80 seconds), or (2) the application no longer detects the presence of the wireless transceiver. In one embodiment, the status of "no detection" at $time_3$ may be a result of the vehicle stopping at a traffic sign.

As discussed herein, withdrawal of the implementation of the set of policies refers to the application of the policy enforcement system returning the network device to its unrestricted or unlimited operating state (e.g., full access to all applications is provided, or at least the same access is provided that was available prior to implementation of the set of policies).

In some embodiments, the battery 208 may be a single use battery such that upon depletion of its energy store, the wireless transceiver 104 may be disposed of. In alternative embodiments, the battery 208 may be one of the following rechargeable battery types, nickel cadmium (NiCd), Nickel-Metal Hydride (NiMH), Lithium Ion (Li-ion), Lithium Ion Polymer (Li-ion polymer), etc.

III. General Methodologies—Policy Enforcement System

Figure 3:
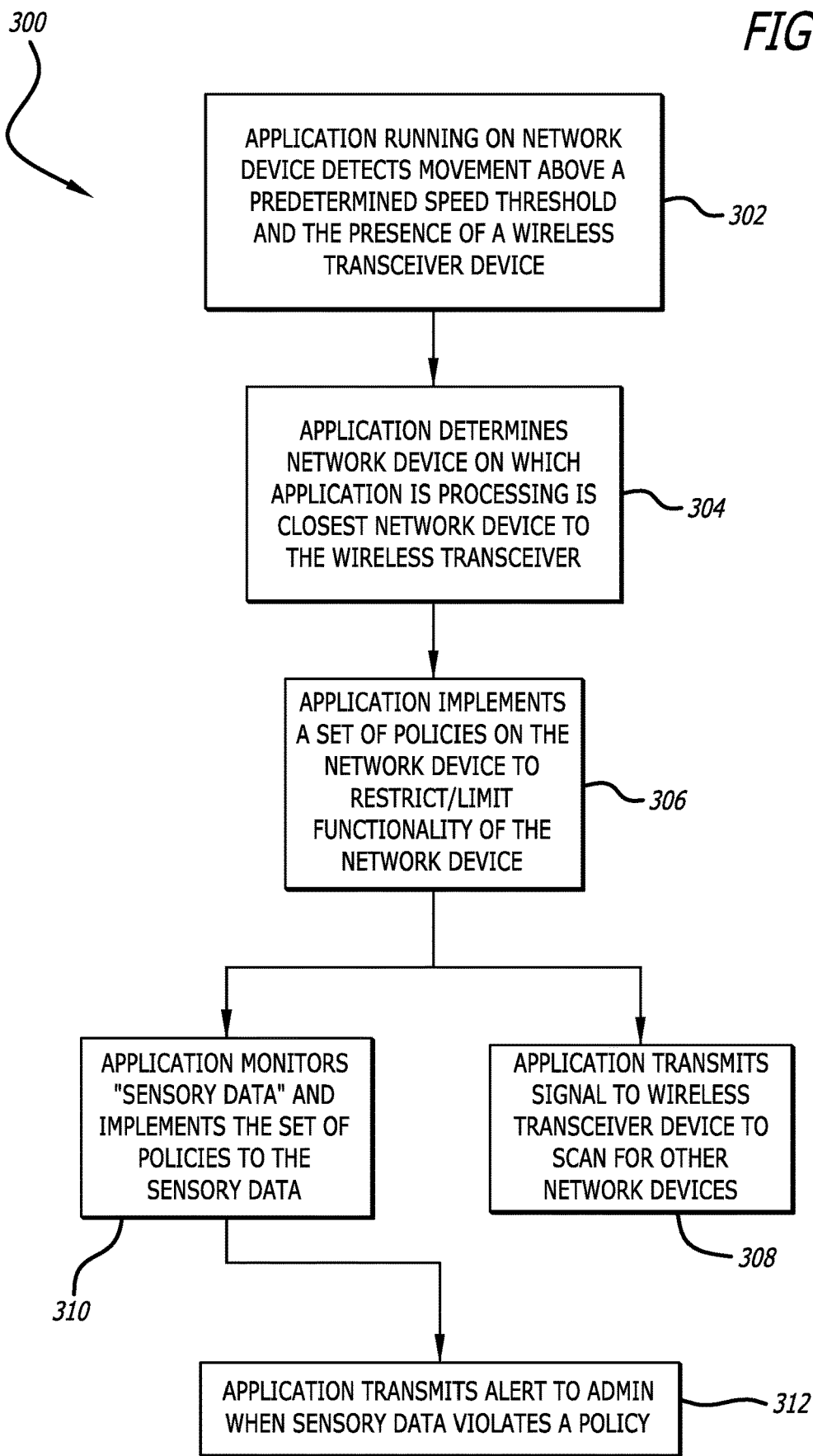
FIG. 3 is a flowchart illustrating an exemplary process of implementing and monitoring a set of policies by a policy enforcement application of the policy enforcement system of FIG. 1A.

Referring to FIG. 3, a flowchart illustrating an exemplary process of implementing and monitoring a set of policies by a policy enforcement application of the policy enforcement system of FIG. 1A is shown. Each block illustrated in FIG. 3 represents an operation performed in the method 300 of applying a set of policies to a network device and monitoring the network device according to at least a subset of the set of policies. In some embodiments, a set of policies may include multiple subsets (i.e., less than the whole). In some such embodiments, the multiple subsets may include a first subset that is directed to restricting the functionality of the network device and a second subset that is directed to monitoring instructions and applicable thresholds. For example, implementation of the first subset of policies may result in removal of icons from the display screen of a mobile device (see FIGS. 5A-5B) in order to restrict functionality of the mobile device. Additionally, implementation of the second subset of policies may cause logic associated with the policy enforcement system (i.e., an application installed on a network device) to monitor certain aspects (e.g., motion via a gyroscope and/or accelerometer).

Referring to the diagram of FIG. 3, in one embodiment, it is assumed that prior to the beginning of the method 300, the application of the policy enforcement system has been installed on a network device (e.g., a mobile device) and a network device sensor (e.g., a wireless transceiver) has been installed or placed within a vehicle. Thus, the method 300 commences when the application processing on the network device detects (i) movement above a predetermined speed threshold (e.g., 5, 10, 15 mph), and (ii) the presence of the wireless transceiver (block 302). In some embodiments, the application obtains sensory data from an accelerometer of the network device in order to determine movement (i.e., acceleration) or from a vibration sensor. Alternatively, or in addition to, the application may obtain sensory data from a GPS unit of the network device in order to determine movement. The presence of the wireless transceiver may be detected based on a signal transmitted from the wireless transceiver in response to a beacon signal transmitted by the network device. The application and wireless transceiver logic then engage in communication in order to determine communication methods and protocol (e.g., a frequency on which to communicate as discussed below). In some embodiments the sensory data obtained from the network device sensor is coupled with the sensory data obtained from the network device to perform a "handshake" that confirms the presence of a wireless transceiver, which prompts the application to implement a set of policies to the network device to restrict and/or limit functionality of the network device. As used herein, the term "handshake" refers to the exchange of information between two devices in order to authenticate one or both of the devices.

In response to detecting (i) movement above a predetermined speed threshold, and (ii) the presence of the wireless transceiver, the application determines whether the network device on which the application is processing is the closest network device to the wireless transceiver (304). FIG. 3 illustrates the flow of method 300 when the application determines the network device on which the application is processing is the closest network device to the wireless transceiver.

Responsive to determining the network device on which the application is processing is the closest network device to the wireless transceiver, the application implements a set of policies, wherein at least a first subset of the policies may restrict or limit functionality of the network device (block 306). As referenced above, the application may perform operations that result in limiting or restricting the functionality of the network device, which may include removing icons from a display screen of the network device as indicated by the first subset of policies. For example, as seen below in FIGS. 5A-5B, icons associated with certain applications running on the network device may be removed to prevent use of the application (e.g., mail, messaging, camera, etc.). Other methods of restricting use of the network device have also been contemplated with examples including, but not limited or restricted to, shading out the icons, shrinking the icons (e.g., altering icons appearance and preventing the opening of the application), disabling and/or delaying notifications, disabling and/or delaying receipt or transmission of data, etc. Other examples of restricting or limiting use of the network device are discussed above and equally applicable in this embodiment.

The method 300 then continues with additional operations that may be performed in parallel or in a concurrent manner (i.e., at least partially overlapping in time); however, there is no such requirement. In further response to detecting (i) movement above a predetermined speed threshold, and (ii) the presence of the wireless transceiver, the application causes the transmission of a signal to the wireless transceiver instructing the wireless transceiver to scan for other network devices (block 308). The scan for other network devices by the wireless transceiver may be done to determine the number of network devices within the vehicle (or within a particular physical region surrounding the wireless transceiver in other non-vehicle deployments). For instance, certain vehicle/driver guidelines may set forth an allowed number of network devices within a vehicle, potentially at certain times of the day, wherein an alert may be transmitted when the vehicle/driver guideline is violated. In other instances, one or more of the components of the policy enforcement system may trigger certain policies or alerts based on what network devices are detected, optionally depending on the time. For example, when the policy enforcement system is deployed within a set of corporate vehicles, as each network device's UUID is received by the wireless transceiver, wireless transceiver logic may determine whether any network devices detected are associated with employees, and whether the presence of multiple employees (or otherwise other network devices) is permitted under the applicable vehicle/driver guidelines and/or set of policies to be implemented.

Additionally, in further response to detecting (i) movement above a predetermined speed threshold, and (ii) the presence of the wireless transceiver, the application implements a first subset of policies to the network device thereby restricting or limiting functionality of the network device, as discussed above (block 310). Additionally, the application may monitor sensory data and apply a second subset of policies to the sensory data.

Following the implementation of the second subset of policies and responsive to determining that monitored sensory data violates one or more policies of the second subset of policies, the application causes performance of operations resulting in the transmission of an alert or signal to administrator (block 312). As used herein, violation of a policy may refer to detection of use or an attempted use of the network device (e.g., handling the network device while operating the vehicle, placing/receiving or attempting to place/receive a call by handling the network device, etc.) For instance, the application may cause transmission of the alert or signal to the policy enforcement server system 102 of FIG. 1A, which may in turn transmit an alert or signal to an administrator. Additionally, the alert or signal may be reviewed as part of a dashboard display (not shown).

Figure 4:
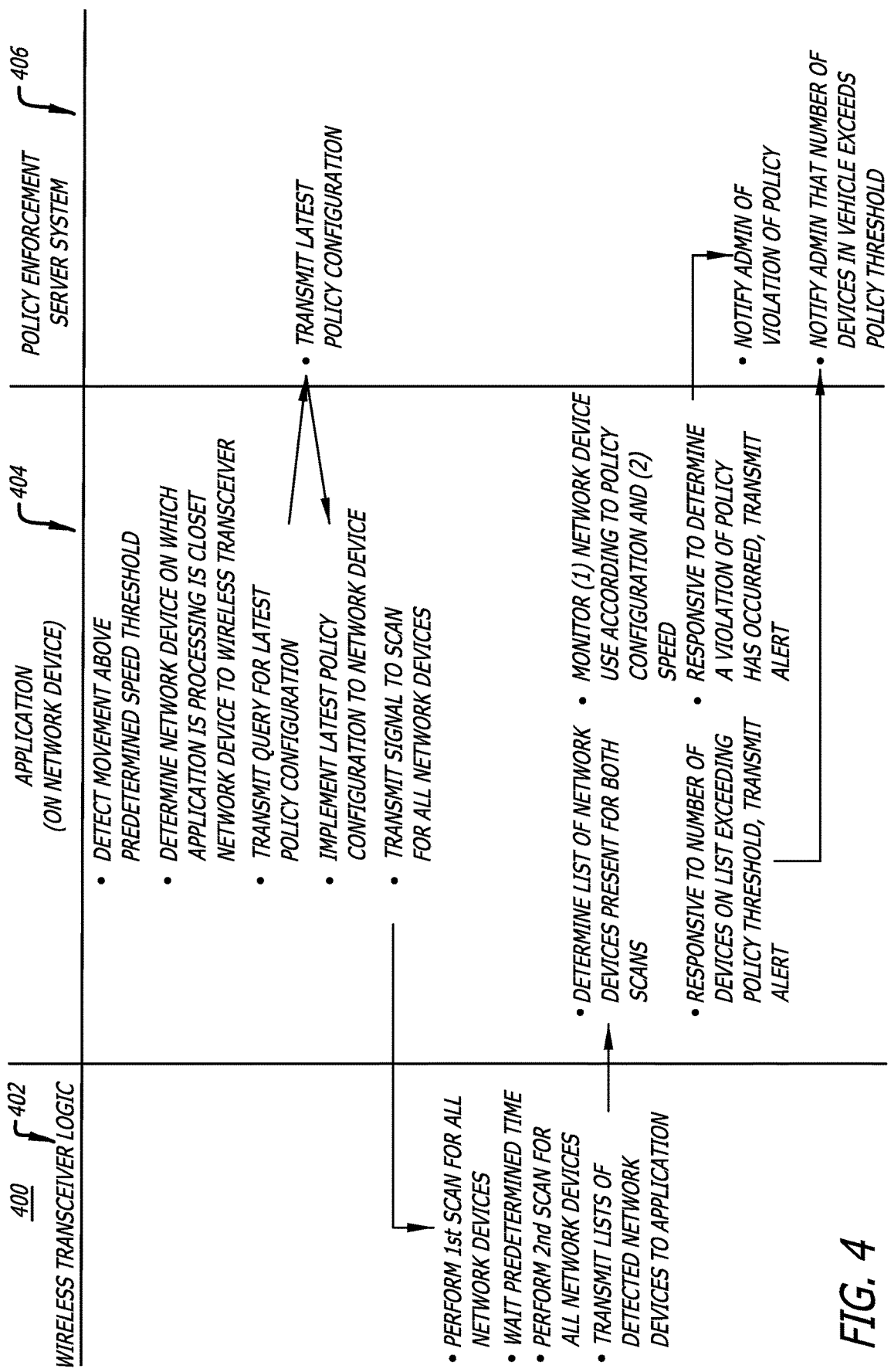
FIG. 4 is an operational flow diagram illustrating operations performed in the process of FIG. 3.

Referring now to FIG. 4, an operational flow diagram illustrating operations performed in the process of FIG. 3 is shown. Specifically, the operational flow diagram includes three columns, one representing each main component of the policy enforcement system: the wireless transceiver logic (column 402); the application (column 404); and the policy enforcement server system (column 406). Each bullet point within a column represents an operation (or operations) performed by the component corresponding to the column. Further, each arrow indicates the transmission of data from a first component to a second component. In some embodiments, the assumptions discussed above with respect to FIG. 3 are equally applicable with respect to FIG. 4.

The operational flow diagram illustrates one embodiment of a process of applying and monitoring a set of policies by the policy enforcement system of FIG. 1A may begin when the application 108 detects movement above a predetermined threshold. Responsive to the detection of movement above the predetermined threshold, the application 108 determines whether the network device on which it is processing is the closest network device to the wireless transceiver 104.

When the application 108 determines whether the network device on which it is processing is the closest network device to the wireless transceiver 104, the application 108 may then transmit a query to the policy enforcement server system 102 for the latest policy configuration (i.e., set of policies to implement). As an alternative, the application 108 may retrieve and utilize the latest received policy configuration from a policy configuration data store, not shown, that is either stored locally on a network device on which the application 108 is operating, i.e., the network device 110, or is otherwise accessible to the application 108.

Following receipt of the request from the application 108, the policy enforcement server system 102 transmits the latest policy configuration to the application 108. In some embodiments, the policy enforcement server system 102 parses the request to identify the network device 110 (and optionally the corresponding user and vehicle, if such data is included in a data store accessible by the policy enforcement server system 102. The policy enforcement server system 102 may then generate a message including the latest policy configuration for transmission.

Following receipt of the message from the policy enforcement server system 102, the application 108, performs several operations which may be in any order. The following operations may also be performed in parallel and include (i) implementing the latest policy configurations with respect to the network device, and (ii) transmitting a signal to the wireless transceiver 104 to be parsed by wireless transceiver logic operating thereon instructing the wireless transceiver logic to perform a scan for additional network devices. Additionally, following the implementation of the latest policy configuration, the application 108 monitors use of the network device according to the latest policy configuration and monitors speed (e.g., of the vehicle 106). Responsive to determining that a violation of the latest policy configuration has occurred, the application 108 may transmit an alert to the policy enforcement server system 102.

Referring to the wireless transceiver 104's receipt of the instructions to scan for additional network devices, the wireless transceiver logic performs a first scan for all network devices (e.g., receives transmissions (beacons) as discussed below) and records identifiers of all detected network devices (and optionally RSSI values of the beacons). The wireless transceiver logic then waits a predetermined time before performing a second scan and recording identifiers of all detected network devices. Following completion of the first and second scans, the records of detected network devices (i.e., a first list and a second list), are transmitted to the application 108, which compares the first list and the second list to determine network devices detected during each scan (i.e., present on both lists). Responsive to the number of network devices detected during both scans exceeding a policy threshold, the application 108 causes transmission of an alert to the policy enforcement server system 102. It should be noted that the determination as to whether a detected number of network devices by the wireless transceiver logic may be based on driver/vehicle guidelines. It should be noted that in some embodiments, the comparison of the lists may be performed by the wireless transceiver logic. Additionally, the first list may be transmitted to the application 108 following the completion of the first scan, there is no requirement that transmission of the first list be performed after completion of the second scan. Additionally, the disclosure is not limited to only two scans. Instead, a plurality of scans may be performed, where additional scans may improve reporting accuracy of detected network devices.

Referring again to column 406 and operations of the policy enforcement server system 102, upon receiving either an alert indicating a policy violation from the application 108 and/or an alert indicating the number of detected network devices during both scans of the wireless transceiver logic, the policy enforcement server system 102 may notify an administrator. Notice to the administrator may be through a message such as a short message service (SMS) message, a multimedia message service (MMS), email, etc. Alternatively, or in addition, notice to the administrator may be provided via (i) a dashboard and/or (ii) a software application operation on a network device (e.g., an "app" operating on a mobile phone or a tablet).

Figure 5A:
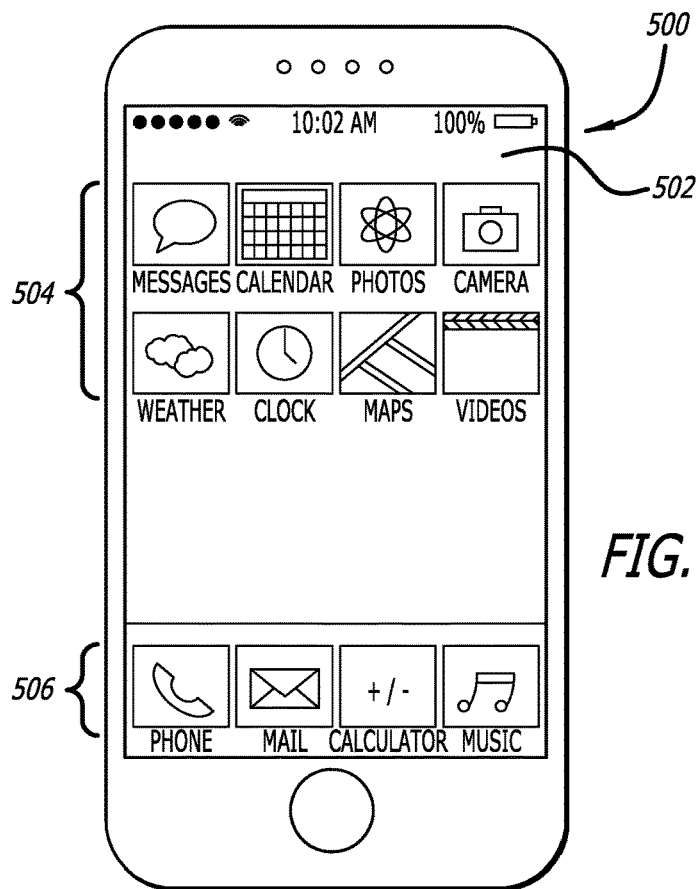
FIG. 5A is an illustration of a network device prior to the implementation of a set of policies by a policy enforcement application of the policy enforcement system of FIG. 1A.

Referring to FIG. 5A, an illustration of a network device prior to the implementation of a set of policies a policy enforcement application of the policy enforcement system of FIG. 1A is shown. FIG. 5A illustrates a network device 500 (e.g., a mobile device) in a first state wherein a display screen 502 has rendered thereon a set of home screen icons 504 and a set of toolbar icons 506. The first state is one in which a set of policies directed at restricting or limiting functionality of the mobile device 500 has not been implemented. For instance, the mobile device 500 may be in the first state when not within a vehicle.

Figure 5B:
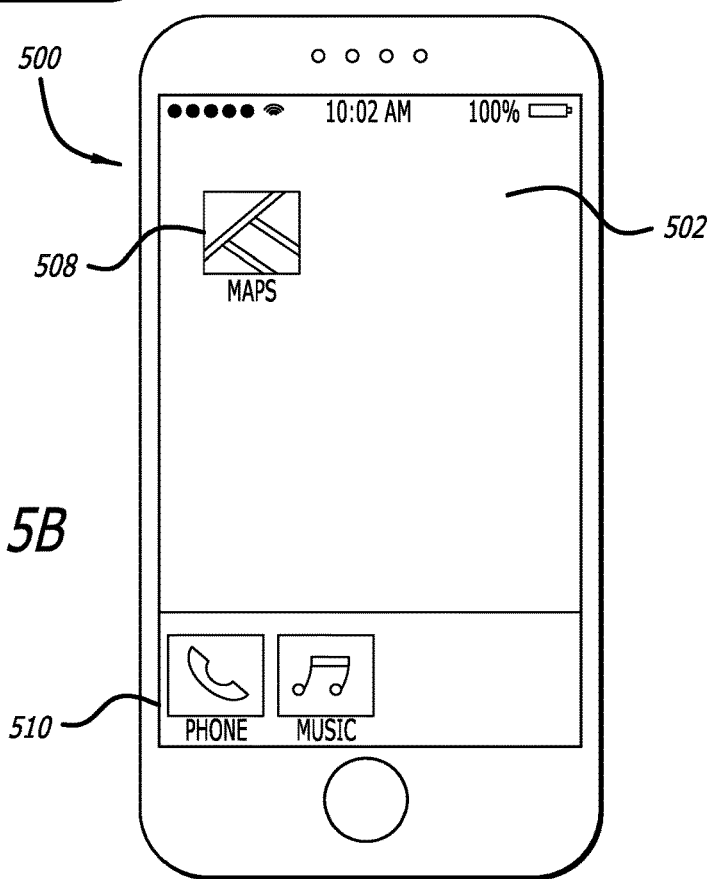
FIG. 5B is an illustration of the network device of FIG. 5A following the implementation of a set of policies by the policy enforcement application of the policy enforcement system of FIG. 1A.

Referring to FIG. 5B, an illustration of the network device of FIG. 5A following the implementation of a set of policies a policy enforcement application of the policy enforcement system of FIG. 1A is shown. FIG. 5B illustrates the mobile device 500 in a second state wherein the display screen 502 has rendered thereon a modified set of home screen icons 508 and a modified set of toolbar icons 510. The second state is one in which a set of policies directed at restricting or limiting functionality of the mobile device 500 has been implemented resulting in the removal of predetermined icons from the display screen 502. As referenced above, the set of policies are directed to restricting or limiting functionality of a mobile device, which may include, for example, restricting use of certain applications on the mobile device in order to reduce distractions (e.g., weather, clock, messages, calendar, photos, camera, videos, etc.). As discussed above, the set of policies may be implemented by an application that is a component of the policy enforcement system and installed on the mobile device 500. Specifically, the set of policies may be implemented to remove icons from a mobile device's display screen when the mobile device is within a moving vehicle, and more specifically, is the mobile device determined by the policy enforcement system to be the driver's mobile device (or at least the closest mobile device to the driver). In some embodiments, the set of policies may be applied by the policy enforcement system of FIG. 1A to a plurality of networks devices, such as the network devices within a region incorporating the interior of a vehicle.

IV. Logical Representation—Policy Enforcement Application

Referring now to FIG. 6, an exemplary embodiment of a logical representation of the policy enforcement application of the policy enforcement system of FIG. 1A is shown. The policy enforcement system application 600 (which may be referred to throughout the disclosure as "the application"), in one embodiment, may be stored on a non-transitory computer-readable storage medium of a network device that includes a housing, which is made entirely or partially of a hardened material (e.g., hardened plastic, metal, glass, composite or any combination thereof) that protects the circuitry within the housing, namely one or more processor(s) 614 that are coupled to a communication interface 616 via a first transmission medium. The communication interface 616, under control by a communication interface logic 618, enables communications with external network devices, such as the wireless transceiver 104 of FIGS. 1A-1C. According to one embodiment of the disclosure, the communication interface 616 may be implemented as a physical interface including one or more ports for wired connectors. Additionally, or in the alternative, the communication interface 616 may be implemented with one or more radio units for supporting wireless communications with other electronic devices. The communication interface logic 618 may perform operations of receiving and transmitting electronic data via the communication interface 616 to enable communications between the policy enforcement system application 600 and network devices via a network (e.g., the internet) and/or cloud computing services.

The processor(s) 614 are further coupled to a persistent storage 612 via a second transmission medium. According to one embodiment of the disclosure, the policy enforcement application 600 may be stored in the persistent storage 612 and include some or all of the following components: a policy implementation logic 602, a sensory data monitoring logic 604, a guideline analysis logic 606 and an alert generation logic 608. The communication interface logic 618 may also be stored in the persistent storage 612. Of course, when implemented as hardware, one or more of these logic units could be implemented separately from each other. In addition, the following data stores, although not illustrated, may be stored locally with respect to the network device 610 and accessible to the policy enforcement application 600: a driver/vehicle guideline data store (DS), a policy configuration DS, a sensory data DS and an alert DS. In some embodiments, one or more of the data stores may be stored remotely and accessible to the policy enforcement application 600. Of course, one or more of the data stores may be implemented together.

According to some embodiments, the policy implementation logic 602 may, upon execution by the processors 614, perform or cause performance of operations including receiving policy configurations from the enforcement policy server system and implementing a set of policies (e.g., provided in the policy configuration), which may include restricting or limiting certain functionality of the network device 610. Various methods or manners of restricting or limiting functionality are discussed above. When a policy violation occurs, the policy implementation logic 602 may provide a signal or other indication to the alert generation logic 608, which is configured to generate alerts.

The sensory data monitoring logic 604 may, upon execution by the processors 614, perform or cause performance of operations including monitoring the handling of and operations performed to/by the network device 610, which may be according to the implemented set of policies and/or driver/vehicle guidelines. The sensory data monitoring logic 604 may provide detected or monitored data to the policy implementation logic 602 for analysis against the implemented set of policies.

The guideline analysis logic 606 may, upon execution by the processors 614, perform or cause performance of operations including analyzing data that is detected or monitored by the sensory data monitoring logic 604 against a set of predetermined driver/vehicle guidelines. The guideline analysis logic 606 may provide a signal or other indication to the alert generation logic 608 when a guideline violation has occurred.

The alert generation logic 608 may, upon execution by the processors 614, perform or cause performance of operations including generating alerts and/or messages to be transmitted to the wireless transceiver and/or the policy enforcement server system, which may in turn generate an alert to be provided to an administrator as discussed above. Additionally, in some embodiments, the policy enforcement server system may merely forward the alert from the alert generation logic 608 to the administrator (or others registered to receive alerts).

The movement detection logic 620 may, upon execution by the processors 614, perform or cause performance of operations including obtaining data that indicates a speed that the network device 610 is traveling and performs a comparison between the data that indicates a speed and a predetermined speed threshold. As one example, the data that indicates a speed may be data from a GPS unit of the network device 610. In some embodiments, the predetermined speed threshold may be 5 miles per hour (mph). In other embodiments, the predetermined speed threshold may be 15 mph. However, it should be understood that these are merely illustrative examples and that other thresholds may be utilized. Further, the predetermined speed threshold may be altered (e.g., through updates to the policy enforcement application 600).

The driver envelope detection logic 622 may, upon execution by the processors 614, perform or cause performance of operations including determining whether the network device 610 is within a driver envelope by comparing the RSSI value of the network device 610 to a drive envelope threshold (e.g., −45 dBm), although other threshold values may be utilized. When the network device 610 is considered within the driver envelope, the network device 610 is considered within a proximity to the driver to be a distraction to driving the vehicle. As a result, the driver envelope detection logic 622 may trigger the policy implementation logic 602 to perform the method 300 of FIG. 3 to determine whether to implement a set of policies thereon.

As not all operations performed by the policy enforcement application 600 have been enumerated and discussed with respect to FIG. 6, it should be understood that the disclosure above regarding operations performed by the policy enforcement application 600 may be performed by one or more of the logic modules illustrated in FIG. 6.

As is understood, decibels per milliwatt (dBm) is the unit used in measuring a power level (e.g., signal strength) of an electrical signal and a decibel is a dimensionless unit used for quantifying a ratio between two values. Thus, RSSI values are indicated in dBm, where a stronger signal is indicated by a higher RSSI value (e.g., a RSSI value of −35 dBm indicates a stronger than a RSSI value of −80 dBm).

V. Determination of Driver Device

As described above, a policy enforcement application ("application") may be installed and operating on a network device that is within a moving vehicle. In such instances, the application may implement a set of policies to restrict the use of certain functionalities of the network device thereby preventing a driver from utilizing the network device for at least certain tasks during operation of the vehicle. As also discussed above, the application may monitor sensory data of the network device such that when a policy is violated (e.g., the driver attempts to utilize the network device), an alert may be generated and transmitted to an administrator. One illustrative example of an instance when such technology may be advantageous is when the driver is a company employee that drives a corporate vehicle as part of his/her job responsibilities.

In some instances, a plurality of network devices each having an instance of the policy enforcement application operating thereon may be located within a single vehicle having a transceiver disposed therein. Accordingly, each instance of the policy enforcement application will connect to the transceiver and attempt to determine whether a set of policies should be implemented to restrict or limit the use of the network device. However, implementation of a set of policies on each network device within the vehicle may not be necessary (e.g., network devices of passengers may be able to operate without restriction or limitation). Thus, some embodiments of the disclosure are directed to determining which of a plurality of network devices is deemed a "driver device," which is assumed to be the network device that is closest to the transceiver, and as a result, closest to the driver. Additionally, some embodiments of the disclosure are directed to determining whether any of the network devices other than the driver device are within a "driver envelope," (e.g., within a specified proximity to the transceiver) which would indicate that the network device is within a specified proximity to the driver, i.e., close enough to the driver to cause the driver to become distracted from driving.

As a precursor to the discussion of the methods 700-800 of FIGS. 7A-8B, upon detection of the presence of a transceiver, each network device attempts to connect to the transceiver to determine whether the network device is the only device present, and if not, obtain data corresponding to network device identifier—RSSI value pairings, where the RSSI value corresponds to the signal strength of a packet transmitted by the network device to the transceiver, which is indicative of the physical proximity of the network device to the transceiver. Thus, the proximity of each network device to the transceiver relative to one another may be determined through comparison of RSSI values corresponding to each network device obtained through scans for packets from each network device performed by the transceiver, where a scan may include a specified time period during which the transceiver receives/accepts (and records) transmissions (e.g., beacons) from network devices. Once a network device determines it is the driver device or is within the driver envelope, a method for determining whether to implement a set of policies thereon may be performed. When a network device determines it is not the driver device or within the driver envelope, the network device may monitor its RSSI value as obtained by the transceiver to determine whether the network device has entered the driver envelope.

Figure 7A:
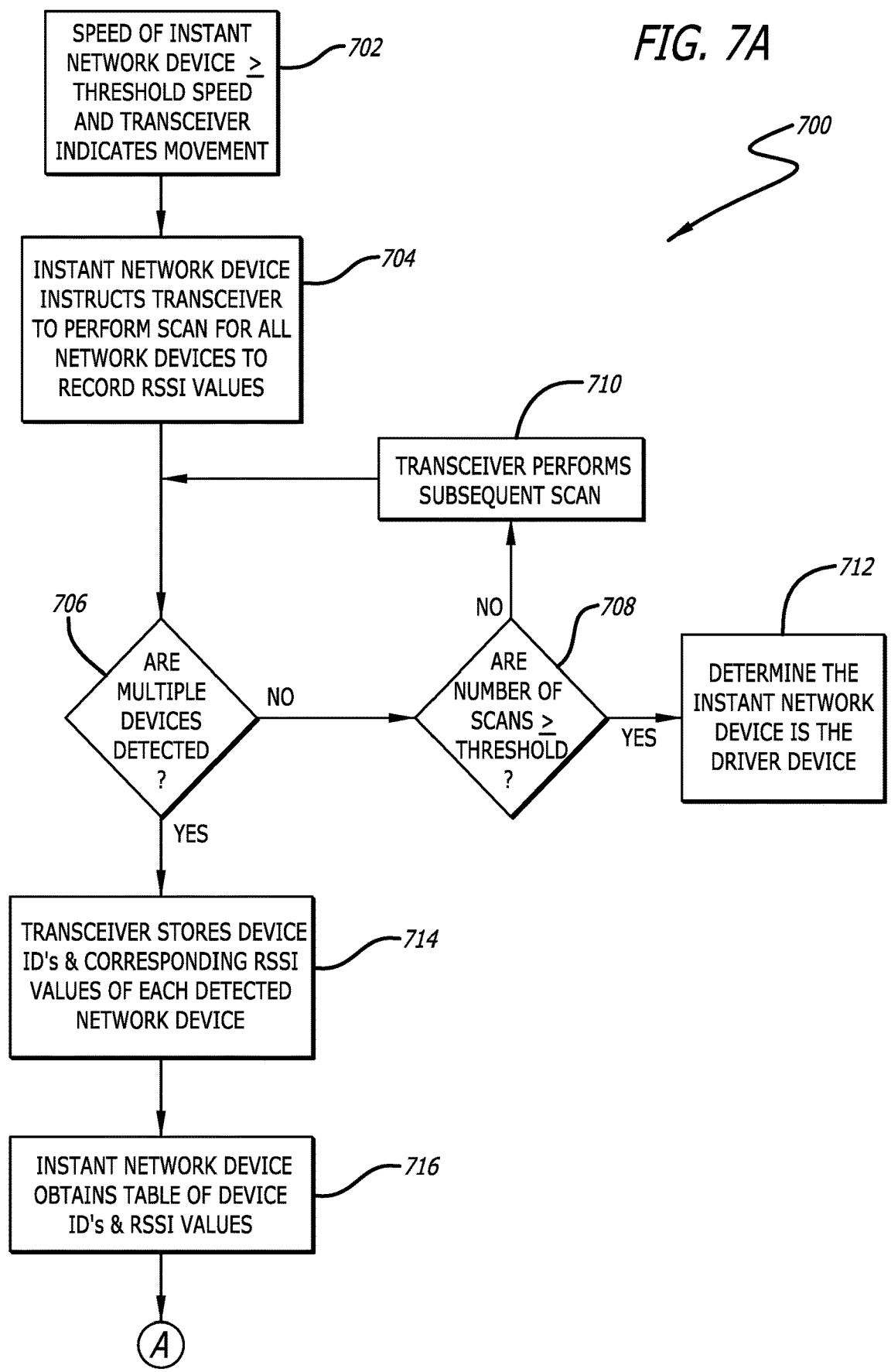
FIGS. 7A-7B illustrate a flowchart of a first exemplary process of determining whether a network device located within a vehicle is the driver device or is within a driver envelope by the policy enforcement application of FIG. 6.
Figure 7B:
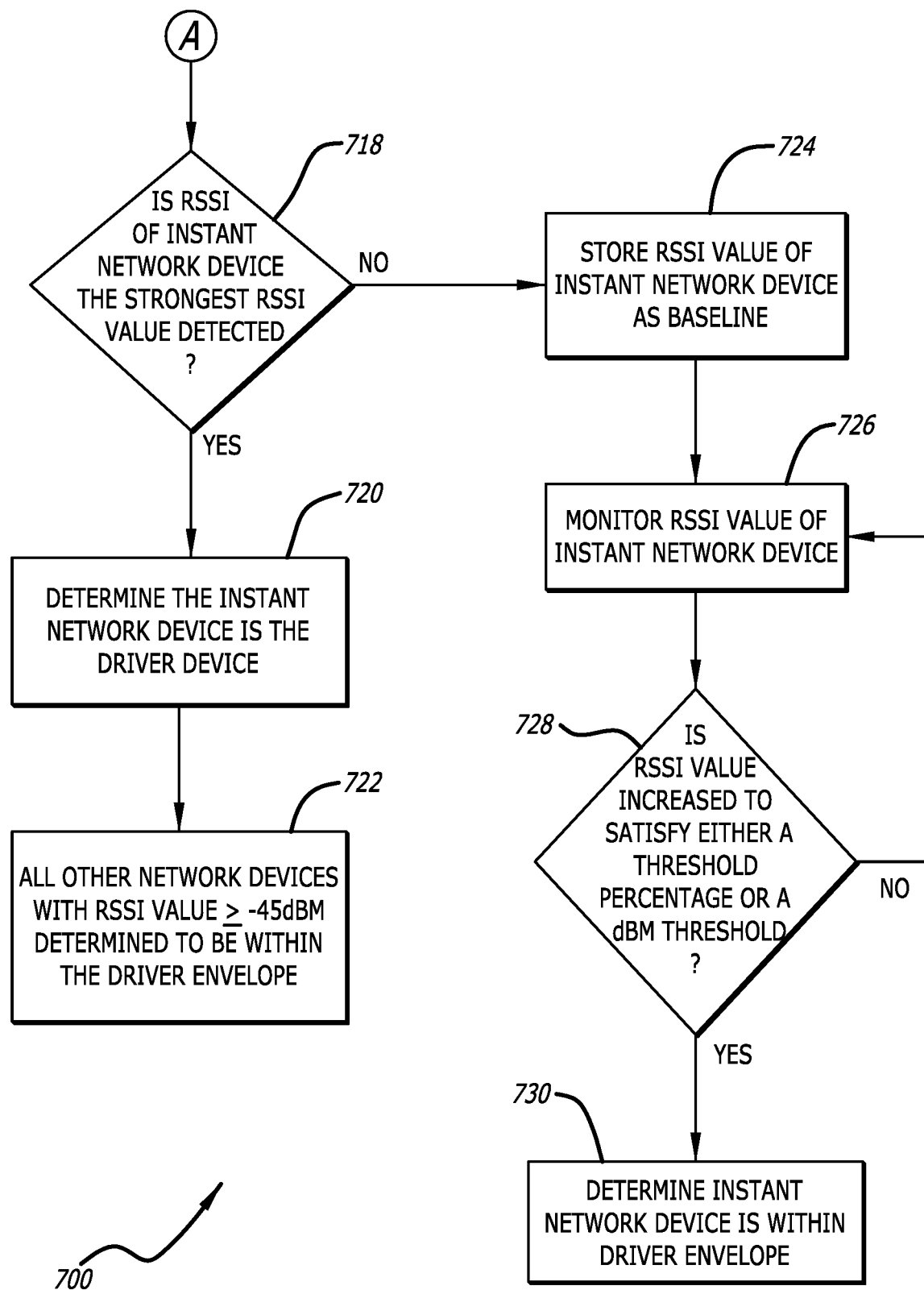

Referring now to FIGS. 7A-7B, a flowchart of a first exemplary process of determining whether a network device located within a vehicle is the driver device or is within a driver envelope by the policy enforcement application of FIG. 6 is shown in accordance with some embodiments. Each block illustrated in FIGS. 7A-7B represents an operation performed in the method 700 of determining whether a network device is to be considered a "driver device" or is within a "driver envelope" for purposes of applying a set of policies to the network device and monitoring the network device according to at least a subset of the set of policies. As noted above, in some embodiments, a set of policies may include multiple subsets where a first subset that is directed to restricting the functionality of the network device and a second subset that is directed to monitoring instructions and applicable thresholds. Where examples of the first and second subsets are discussed above.

Prior to performance of the operations of the method 700, it may be assumed that one or more network devices, each having an instance of the policy enforcement application operating thereon, are located within a vehicle. It may be further assumed that a transceiver, such as the transceiver 104, is also located within the vehicle. Specifically, the transceiver may be affixed to an upper left corner, a lower left corner or generally the left side of the vehicle's windshield relative to the driver's perspective. In other embodiments, the transceiver may be affixed to the dashboard behind the steering wheel or otherwise in line with a driver's seat. In yet other examples, the transceiver may be affixed to the ceiling of the vehicle above the steering wheel or the driver's seat.

The method 700 will be discussed from the perspective of an "instant network device," where the operations of method 700 are performed by an instance of the policy enforcement application operating on the instant network device unless otherwise stated. Further, the instant network device may be one of a plurality of network devices located within the vehicle where the operations comprising the method 700 seek to determine whether the instant network device is to be considered the "driver device" on which a set of policies is to be implemented. It is further assumed that the instant network device has exchanged an initial set of messages with the transceiver (e.g., a connection request and an acknowledgement), which serve to at least indicate to the policy enforcement application operating on the network device that the network device may be located within a vehicle.

With reference now to FIG. 7A, the method 700 commences when the speed of the instant network device satisfies a speed threshold comparison and the transceiver indicates movement (block 702). Specifically, the instant network device includes components configured to obtain data indicating speed (e.g., a GPS unit), and the transceiver may include components to detect movement including an accelerometer and a vibration sensor, as seen in FIG. 2. With respect to the transceiver, an acceleration of zero (0) mph and a predetermined continuous time frame of a lack of detected vibration, together, indicate the transceiver is not moving (or otherwise has a speed of zero (0) mph). For example, the vibration sensor performs a vibration detection at regular intervals (e.g., every second) where the vibration sensor records a'1' when vibration is detected and a '0' when vibration is not detected. The combination of an acceleration of zero (0) mph and a continuous string of a predetermined number of 0's (e.g., eight) may indicate to the transceiver and/or the policy enforcement application that the transceiver (and thus the vehicle) is not moving (has a speed of zero (0) mph).

In one embodiment, the movement detection logic 620 obtains data from a GPS unit of the instant network device and determines whether the speed indicated by the GPS unit data satisfies the predetermined speed threshold. For example, the movement detection logic 620 may determine whether the instant network device is traveling at a speed of at least 5 mph. Similarly, the movement detection logic 620 may obtain data from the transceiver (obtained from the vibration sensor and the accelerometer) and determine whether the vibration data and acceleration data indicate movement of the transceiver.

Once the speed of the instant network device satisfies the speed threshold and the transceiver indicates movement of the vehicle, the policy enforcement application operating on the instant network device instructs the transceiver to begin a device scan operation (block 704). In performing the device scan operation, the transceiver begins to receive and record transmissions from network devices, as described above at least with respect to FIG. 4. In some embodiments, the scan time period may be a predetermined number of seconds (e.g., 2-5 seconds). The device scan operation may conclude when the instant network device transmits a command to end the device scan operation to the transceiver, where conclusion of the scan may result in the transceiver refusing to receive subsequent transmissions (or at least not record receipt of such as part of results of the scan). In other embodiments, the device scan may conclude automatically after a predetermined time (e.g., the transceiver refuses to receive and record such after a predetermined time that may be either preset as a configuration parameter of the transceiver or may be included in the command to begin a scan).

Following the device scan operation, the transceiver may determine whether multiple network devices have been detected (block 706). For example, the transceiver may determine whether multiple network devices are within range of the transceiver (due to receipt of a transmission for the network device). When the transceiver detects only a single network device (the instant network device), the transceiver determines whether a threshold number of device scan operations have been performed (block 708). In some embodiments, as an alternative to block 706, the transceiver may perform multiple scans regardless of whether multiple devices are detected during a single scan. When the threshold number have not been performed, the transceiver performs a subsequent scan and the method 700 then returns to block 706 (block 710). In some embodiments, the list of detected network devices may be provided to the instant network device following each scan.

When the threshold number of scans have been performed and only the instant network device has been detected, such information is relayed to the instant network device, where the policy enforcement application determines that the instant network device is the driver device (block 712). Once the policy enforcement application determines that the instant network device is the driver device, the method 300 of FIG. 3 is performed to determine whether to implement a set of policies on the instant network device.

When multiple network devices are detected, the transceiver parses each received transmission and stores a network device identifier—RSSI value pairing for each received transmission in a data store, which is then obtained by the instant network device (blocks 706, 714-716). In an alternative embodiment, the transceiver may perform a comparison of the RSSI value of each received transmission to a threshold value (e.g., a dBm value) and, for those RSSI values that satisfy the threshold value comparison, include the network device identifier—RSSI value pairings in a list that is transferred to the instant network device.

Continuing now with reference to FIG. 7B, the policy enforcement application of the instant network device then determines whether the RSSI value of the instant network device is the strongest RSSI value recorded in the data store (block 718). When the RSSI value of the instant network device is the strongest in the data store, the instant network device is determined to be the driver device and the method 300 of FIG. 3 is performed to determine whether to implement a set of policies on the instant network device (block 720). Additionally, each instance of the policy enforcement application operating on the other network devices present within the vehicle will perform the same method referenced above and determine whether the corresponding network device is within a driver envelope (block 722). Although not the strongest detected RSSI value, a network device may be deemed within the "driver envelope" when the RSSI value corresponding to the network device is at least a threshold value, such as −45 dBm, although other threshold values may be utilized. When a network device is considered within the driver envelope, the network device is considered within a proximity to the driver to be a distraction to driving the vehicle. As a result, the instance of the policy enforcement application operating on a network device within the driver envelope may perform the method 300 of FIG. 3 to determine whether to implement a set of policies thereon.

When the RSSI value of the instant network device is not the strongest detected value, the RSSI value of the instant network device is stored as a baseline RSSI value and the policy enforcement application instance monitors the RSSI of the network device (blocks 724-726). In some embodiments, the policy enforcement application may, at regular intervals, transmit a request communication to the transceiver, such as an advertisement packet and/or a request for the RSSI value of the network device. In response, the network device may receive a response communication that includes the RSSI value of the request communication. As a result, the policy enforcement application monitors the RSSI value of the network device.

When the RSSI value of the instant network device has increased by either a threshold percentage or a value threshold (e.g., in dBms), the instance of the policy enforcement application operating on the instant network device determines the instant network device is within the driver envelope (blocks 728-730). As a result, the instance of the policy enforcement application operating on the instant network device performs the method 300 of FIG. 3 to determine whether to implement a set of policies thereon.

Figure 8A:
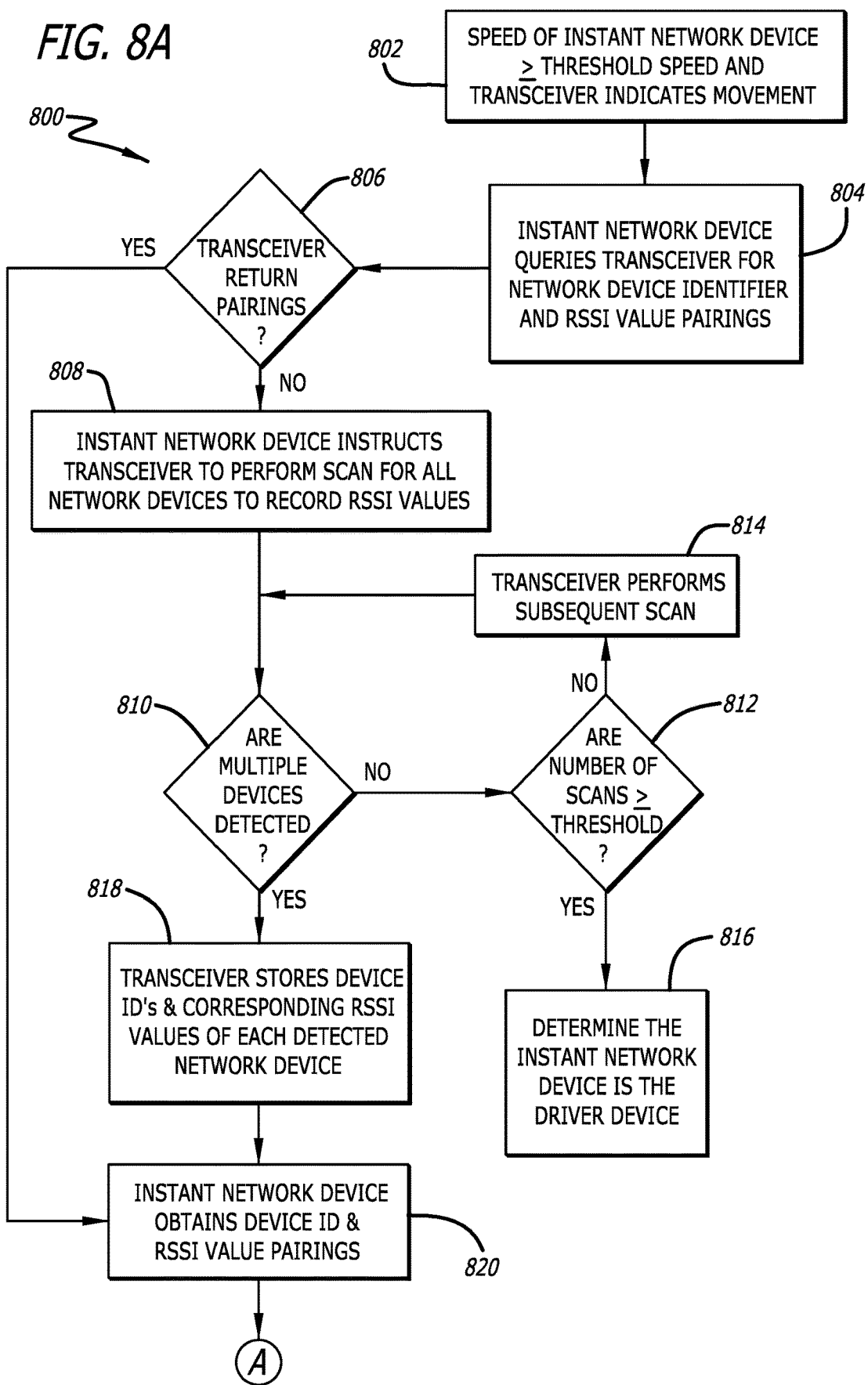
FIGS. 8A-8B illustrate a flowchart of a second exemplary process of determining whether a network device located within a vehicle is the driver device or is within a driver envelope by the policy enforcement application of FIG. 6.
Figure 8B:
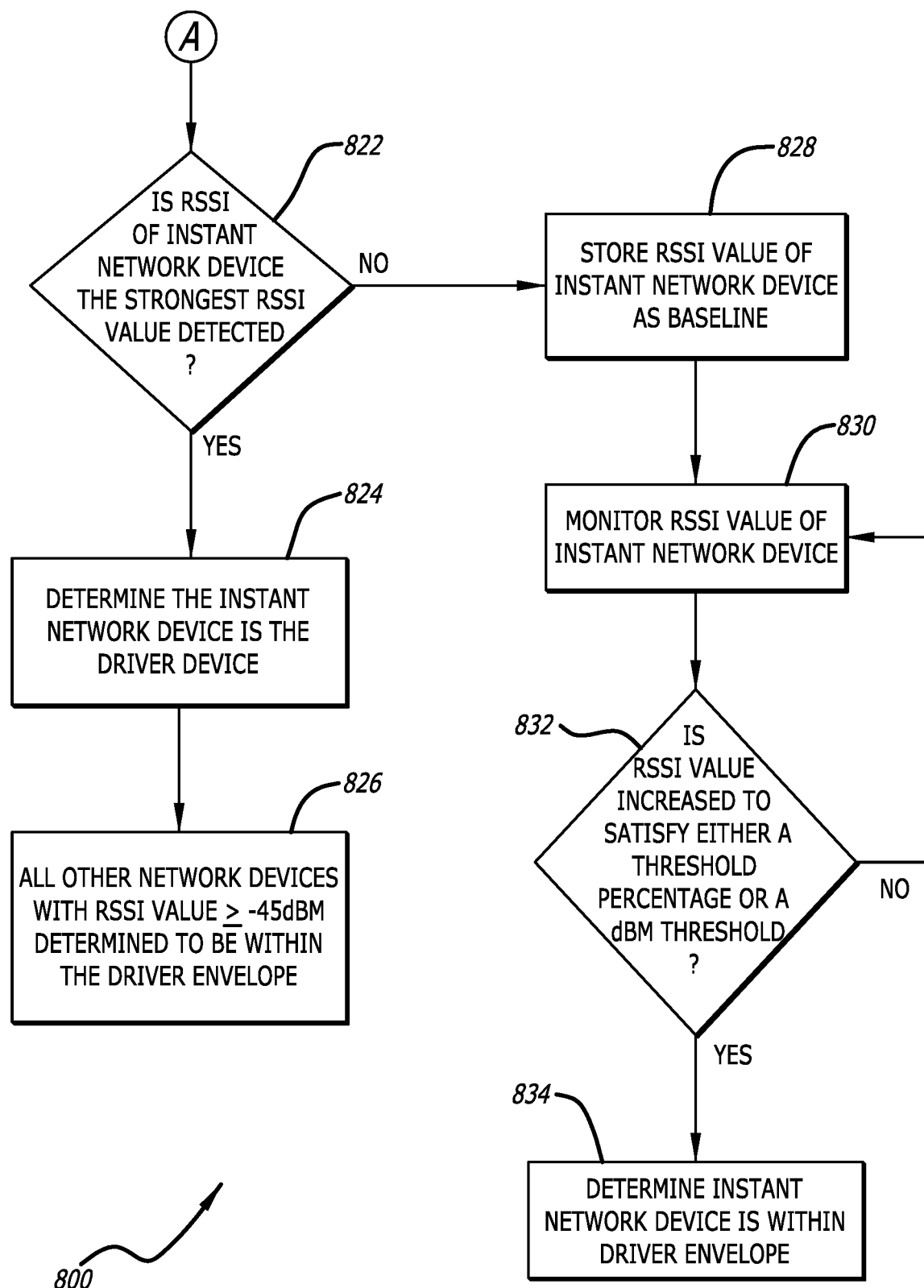

Referring to FIGS. 8A-8B, illustrate a flowchart of a second exemplary process of determining whether a network device located within a vehicle is the driver device or is within a driver envelope by the policy enforcement application of FIG. 6 is shown in accordance with some embodiments. The same assumptions as discussed above with respect to method 700 may apply equally to the method 800, which commences when the speed of the instant network device satisfies a speed threshold comparison and the transceiver indicates movement (block 802), which corresponds to the block 702. The instance of the policy enforcement application operating on the instant network device then queries the transceiver for data containing one or more pairings of network device identifiers and corresponding RSSI values (block 804), where the pairings may be obtained by the transceiver in the same manner as discussed above with respect to method 700.

When the transceiver returns the identifier—RSSI value pairing data, the method 800 proceeds to block 820, discussed below (block 806). However, when the transceiver does not return the identifier—RSSI value pairing data, the instance of the policy enforcement application operating on the instant network device instructs the transceiver to perform a scan for all network devices and record corresponding RSSI values, where particulars of the scan(s) performed by the transceiver are discussed above with respect to method 700 (blocks 806-808).

Following the device scan operation, the transceiver determines whether there are multiple network devices within the vehicle (block 810). When the transceiver detects only a single network device (the instant network device), the transceiver determines whether a threshold number of device scan operations have been performed and when the threshold number have not been performed, the transceiver performs a subsequent scan and the method 800 then returns to block 810 (blocks 812-814).

When the threshold number have been performed and only the instant network device has been detected, such information is relayed to the instant network device, where the policy enforcement application determines that the instant network device is the driver device (block 816). Once the policy enforcement application determines that the instant network device is the driver device, the method 300 of FIG. 3 is performed to determine whether to implement a set of policies on the instant network device.

When multiple network devices are detected, the transceiver parses each received advertisement packet and stores a network device identifier—RSSI value pairing for each received advertisement packet in a data store, which is then obtained by the instant network device as well as the other network devices within proximity of the transceiver to receive the request for an advertisement packet (blocks 818-820). Following the scan operation(s) of method 800, the transceiver has stored the network device identifier—RSSI value pairings within a data store (e.g., in a table format but such is not required and the disclosure is not intended to be so limited). As a result, when each network device subsequently queries the transceiver for the network device identifier—RSSI value pairings, the transceiver will return the network device identifier—RSSI value pairings (see blocks 802-806). Thus, as should be understood, the series of one or more scan operations may only need to be performed once, as a result of instruction by the first network device to connect to the transceiver and request the network device identifier—RSSI value pairings.

Continuing with reference now to FIG. 8B, the policy enforcement application of the instant network device then determines whether the RSSI value of the instant network device is the strongest RSSI value recorded in the data store (block 822). When the RSSI value of the instant network device is the strongest in the data store, the instant network device is determined to be the driver device and the method 300 of FIG. 3 is performed to determine whether to implement a set of policies on the instant network device (block 824). Additionally, each instance of the policy enforcement application operating on the other network devices present within the vehicle will perform the same method referenced above and determine whether the corresponding network device is within a driver envelope (block 826). As discussed above with respect to block 722 of the method 700, a network device may be deemed within the driver envelope when the RSSI value corresponding to the network device is at least a threshold value and, when such occurs, the instance of the policy enforcement application operating on a network device within the driver envelope may perform the method 300 of FIG. 3 to determine whether to implement a set of policies thereon.

When the RSSI value of the instant network device is not the strongest detected value, the RSSI value of the instant network device is stored as a baseline RSSI value and the policy enforcement application instance monitors the RSSI of the instant network device, as discussed above with respect to method 700 (blocks 828-830). When the RSSI value of the instant network device has increased by either a threshold percentage or a value threshold (e.g., in dBms), the instance of the policy enforcement application operating on the instant network device determines the instant network device is within the driver envelope (blocks 832-834). As a result, the instance of the policy enforcement application operating on the instant network device performs the method 300 of FIG. 3 to determine whether to implement a set of policies thereon.

In the foregoing description, the invention is described with reference to specific exemplary embodiments thereof. However, it will be evident that various modifications and changes may be made thereto without departing from the broader spirit and scope of the invention as set forth in the appended claims.

What is claimed is:

1. A computerized method of determining whether a first network device of a plurality of network devices located within a vehicle is a driver device, the computerized method comprising:
   detecting (i) movement of the first network device at a speed above a predetermined threshold and (ii) presence of a transceiver;
   obtaining network device identifier—received signal strength indicator (RSSI) value pairing data from the transceiver, wherein the network device identifier—RSSI value pairing data includes a listing of a pairing of: (a) a network device identifier for each of the plurality of network devices detected by the transceiver, and (b) a RSSI value corresponding to a transmission received by the transceiver from each of the plurality of network devices; and
   when a RSSI value of the first network device is a greatest value included within the network device identifier—RSSI value pairing data, determining the first network device is the driver device and implementing a set of policies on the first network device, wherein implementation of the set of policies is configured to restrict functionality of the first network device according to a predefined list of functionalities.

2. The computerized method of claim 1, further comprising:
   when the RSSI value of the first network device is not the greatest value included within the network device identifier—RSSI value pairing data, monitoring the RSSI value of the first network device; and
   when an increase in the RSSI value of the first network device satisfies a threshold comparison, determining the first network device is within a driver envelope and implementing the set of policies on the first network device.

3. The computerized method of claim 2, wherein the driver envelope corresponds to a physical proximity to the transceiver.

4. The computerized method of claim 1, wherein obtaining the network device identifier—RSSI value pairing data from the transceiver includes:
   instructing the transceiver to perform a scan operation to obtain and store RSSI values corresponding to one or more network devices; and
   receiving a communication that includes the RSSI values corresponding to the one or more network devices.

5. The computerized method of claim 4, wherein further instructing the transceiver to perform a plurality of scan operations when only the RSSI value of the first network device is obtained during a first scan operation.

6. The computerized method of claim 1, wherein obtaining the network device identifier—RSSI value pairing data from the transceiver includes:
   querying the transceiver for the network device identifier—RSSI value pairing data; and
   when the transceiver does not return the network device identifier—RSSI value pairing data, (i) instructing the transceiver to perform a scan operation to obtain and store RSSI values corresponding to one or more network devices, and (ii) receiving a communication that includes the RSSI values corresponding to the one or more network devices.

7. The computerized method of claim 1, wherein RSSI values of network devices are obtained by the transceiver upon receipt of an advertising packet transmitted by the network devices.

8. A non-transitory computer readable storage medium having stored thereon instructions, the instructions being executable by one or more processors to perform operations comprising:
   detecting (i) movement of a first network device of a plurality of network devices at a speed above a predetermined threshold and (ii) presence of a transceiver;
   obtaining network device identifier—received signal strength indicator (RSSI) value pairing data from the transceiver, wherein the network device identifier—RSSI value pairing data includes a listing of a pairing of: (a) a network device identifier for each of the plurality of network devices detected by the transceiver, and (b) a RSSI value corresponding to a transmission received by the transceiver from each of the plurality of network devices; and
   when a RSSI value of the first network device is a greatest value included within the network device identifier—RSSI value pairing data, determining the first network device is the driver device and implementing a set of policies on the first network device, wherein implementation of the set of policies is configured to restrict functionality of the first network device according to a predefined list of functionalities.

9. The non-transitory computer readable storage medium of claim 8, further comprising:
   when the RSSI value of the first network device is not the greatest value included within the network device identifier—RSSI value pairing data, monitoring the RSSI value of the first network device; and
   when an increase in the RSSI value of the first network device satisfies a threshold comparison, determining the first network device is within a driver envelope and implementing the set of policies on the first network device.

10. The non-transitory computer readable storage medium of claim 9, wherein the driver envelope corresponds to a physical proximity to the transceiver.

11. The non-transitory computer readable storage medium of claim 8, wherein obtaining the network device identifier—RSSI value pairing data from the transceiver includes:
   instructing the transceiver to perform a scan operation to obtain and store RSSI values corresponding to one or more network devices; and
   receiving a communication that includes the RSSI values corresponding to the one or more network devices.

12. The non-transitory computer readable storage medium of claim 11, wherein further instructing the transceiver to perform a plurality of scan operations when only the RSSI value of the first network device is obtained during a first scan operation.

13. The non-transitory computer readable storage medium of claim 8, wherein obtaining the network device identifier—RSSI value pairing data from the transceiver includes:
   querying the transceiver for the network device identifier—RSSI value pairing data; and
   when the transceiver does not return the network device identifier—RSSI value pairing data, (i) instructing the transceiver to perform a scan operation to obtain and store RSSI values corresponding to one or more network devices, and (ii) receiving a communication that includes the RSSI values corresponding to the one or more network devices.

14. The non-transitory computer readable storage medium of claim 8, wherein RSSI values of network devices are obtained by the transceiver upon receipt of an advertising packet transmitted by the network devices.

15. A system configured to determine whether a first network device of a plurality of network devices located within a vehicle is a driver device, the computerized method comprising:
- a transceiver; and
- logic stored on non-transitory computer readable storage medium of the first network device that, when executed by one or more processors of the first network device, causes performance of operations including:
  - detecting (i) movement of a first network device at a speed above a predetermined threshold and (ii) presence of the transceiver;
  - obtaining network device identifier—received signal strength indicator (RSSI) value pairing data from the transceiver, wherein the network device identifier—RSSI value pairing data includes a listing of a pairing of: (a) a network device identifier for each of the plurality of network devices detected by the transceiver, and (b) a RSSI value corresponding to a transmission received by the transceiver from each of the plurality of network devices; and
  - when a RSSI value of the first network device is a greatest value included within the network device identifier—RSSI value pairing data, determining the first network device is the driver device and implementing a set of policies on the first network device, wherein implementation of the set of policies is configured to restrict functionality of the first network device according to a predefined list of functionalities.

16. The system of claim 15, further comprising:
when the RSSI value of the first network device is not the greatest value included within the network device identifier—RSSI value pairing data, monitoring the RSSI value of the first network device; and
when an increase in the RSSI value of the first network device satisfies a threshold comparison, determining the first network device is within a driver envelope and implementing the set of policies on the first network device.

17. The system of claim 16, wherein the driver envelope corresponds to a physical proximity to the transceiver.

18. The system of claim 15, wherein obtaining the network device identifier—RSSI value pairing data from the transceiver includes:
- instructing the transceiver to perform a scan operation to obtain and store RSSI values corresponding to one or more network devices; and
- receiving a communication that includes the RSSI values corresponding to the one or more network devices.

19. The system of claim 18, wherein further instructing the transceiver to perform a plurality of scan operations when only the RSSI value of the first network device is obtained during a first scan operation.

20. The system of claim 15, wherein obtaining the network device identifier—RSSI value pairing data from the transceiver includes:
- querying the transceiver for the network device identifier—RSSI value pairing data; and
- when the transceiver does not return the network device identifier—RSSI value pairing data, (i) instructing the transceiver to perform a scan operation to obtain and store RSSI values corresponding to one or more network devices, and (ii) receiving a communication that includes the RSSI values corresponding to the one or more network devices.

* * * * *